(12) United States Patent
Meisner et al.

(10) Patent No.: US 10,144,178 B2
(45) Date of Patent: *Dec. 4, 2018

(54) THREE-DIMENSIONAL MODELLING AND/OR MANUFACTURING APPARATUS, AND RELATED PROCESSES

(71) Applicant: VOXEL 3D LLC, Salt Lake City, UT (US)

(72) Inventors: Milton Dale Meisner, Temecula, CA (US); Robin Wynne Nack Meisner, Temecula, CA (US)

(73) Assignee: Voxel LLC, Salt Lake City, UT (US)

( * ) Notice: Subject to any disclaimer, the term of this patent is extended or adjusted under 35 U.S.C. 154(b) by 334 days.

This patent is subject to a terminal disclaimer.

(21) Appl. No.: 15/050,411

(22) Filed: Feb. 22, 2016

(65) Prior Publication Data
US 2017/0100891 A1    Apr. 13, 2017

Related U.S. Application Data

(63) Continuation of application No. 14/877,797, filed on Oct. 7, 2015.

(51) Int. Cl.
*B29C 67/00*      (2017.01)
*B29C 64/386*    (2017.01)
(Continued)

(52) U.S. Cl.
CPC ............ *B29C 64/386* (2017.08); *B29C 47/00* (2013.01); *B29C 47/0045* (2013.01);
(Continued)

(58) Field of Classification Search
CPC ..... B29C 64/124; B29C 64/20; B29C 64/129; B29C 64/135; B29C 64/386; B29C 47/00;
(Continued)

(56) References Cited

U.S. PATENT DOCUMENTS 9,840,045 B2*  12/2017  Linnell ................ B29C 64/386
2011/0014355 A1*  1/2011  Maalderink ........... B29C 64/106
427/9

(Continued)

*Primary Examiner* — Robert J Grun
(74) *Attorney, Agent, or Firm* — David Allan Jones

(57) ABSTRACT

A uniquely featured addition to previous three dimensional prototyping machinery without any traversing X and Y coordinate moving parts, thus saving time by focusing on only an incrementally regular Z stage and the rapidity of chemical deposition via electrically localized reaction nodes through a porous/channeled plane called the build/extrusion platen. Processes for making objects using such machine and platen are also disclosed as well as features and further indexing of extrusion location inventions. Other features including chemistry, curing material, and curing control as well as activation methods and machines are also disclosed in combination with the feature of a simultaneous two-dimensional layer-wise deposition machine and process for "growing" the object in the Z direction using the displaceable platen or object supporting stage in a rapid manner. Further due to the rapid growth and deposition manner, additional benefits to the object creation and curable material, e.g. a monomer can be realized.

20 Claims, 11 Drawing Sheets

(51) Int. Cl.
*B33Y 10/00* (2015.01)
*B33Y 30/00* (2015.01)
*B33Y 50/02* (2015.01)
*B29C 47/00* (2006.01)
*B29C 64/106* (2017.01)
*B29C 64/124* (2017.01)
*B29C 64/135* (2017.01)
*B29C 64/129* (2017.01)
*B29C 64/20* (2017.01)
*B29C 64/40* (2017.01)
*B29C 47/08* (2006.01)
*B29K 105/24* (2006.01)
*B29C 35/02* (2006.01)

(52) U.S. Cl.
CPC ........ *B29C 47/0866* (2013.01); *B29C 64/106* (2017.08); *B29C 64/124* (2017.08); *B29C 64/129* (2017.08); *B29C 64/135* (2017.08); *B29C 64/20* (2017.08); *B29C 64/40* (2017.08); *B33Y 10/00* (2014.12); *B33Y 30/00* (2014.12); *B33Y 50/02* (2014.12); *B29C 35/0266* (2013.01); *B29K 2105/246* (2013.01)

(58) Field of Classification Search
CPC . B29C 64/106; B29K 2105/246; B33Y 30/00; B33Y 10/00; B33Y 50/02
See application file for complete search history.

(56) References Cited

U.S. PATENT DOCUMENTS

| | | | |
|---|---|---|---|
| 2016/0185045 A1* | 6/2016 | Linnell | B29C 67/0088 264/401 |
| 2018/0071982 A1* | 3/2018 | Linnell | B29C 64/245 |
| 2018/0117833 A1* | 5/2018 | Nagahari | B33Y 10/00 |

* cited by examiner

THREE-DIMENSIONAL MODELLING AND/OR MANUFACTURING APPARATUS, AND RELATED PROCESSES

CROSS-REFERENCE TO RELATED APPLICATIONS

This application is a continuation of U.S. patent application Ser. No. 14/877,797 filed Oct. 7, 2015, which claims the benefit of, and priority to, U.S. Provisional Patent Application 62/061,024 filed Oct. 7, 2014. The contents of both of these applications are hereby incorporated by reference herein.

Previous patent filings by the inventor Milton Meisner as discussed herein include U.S. Patent Publication 2009/0051863 A1 "Displays Including Addressable Trace Structures," U.S. Pat. No. 7,427,201 "Resonant Frequency Filtered Arrays for Discrete Addressing of a Matrix," and International Publication WO 2008/151063 "High Definition Versatile Stereolithic Method and Material," the contents of all three documents and related files are hereby incorporated herein by reference in their entirety.

BACKGROUND

The field of the Invention is computer-controlled three-dimensional ("3D") object formation via deposition of materials to create objects. Most viable means of 3D object formation are effected via computer aided design, employing a machine and materials developed for this purpose.

Generally called "Three-dimensional printing," and "3D Printing," this process has also been referred to as "Stereolithography," "Rapid Prototyping," and "Additive Manufacturing," among other names, usually depending upon the chosen method.

3D object building can be generally defined as the serial, layer-wise deposition and stacking of sequential cross-sections of an object. The methods available are varied and include sintered powder layers affixed by lasers or sprayed adhesive, ink jet droplets of monomers UV/photo-curing in situ, extruded plastic filament heated to melting, deposited and then cooled to reform as a solid, and more. In addition to the additive methods, subtractive methods are employed, referring to the computer-controlled removal of material for shaping of layers. All the aforementioned are included the field of this invention. Following this introduction is a further discussion and list of methods and comparisons between them.

Three-dimensional "3D" Printing, also known as "Additive Manufacturing," is a relatively new field of science wherein objects are built via Computer Aided Modeling, triggering the controlled layer-wise deposition of curable or harden-able/catalyzed materials using various processes, to build a three-dimensional object.

In general, additive processes are used, wherein successive layers of build material are deposited and stacked according to the requisite geometry of each cross-section layer of the object being built. These objects can be of almost any shape or geometry, and are produced from a 3D model or other electronic data source. The building occurs wherein a tracing of x/y planes is effected via mechanical movement similar to that of a print head over paper in a printer. Instead of depositing ink, the head is depositing an adhesive, a thermoplastic, or other buildable material; or the tracing mechanism may be delivering a catalyst such as a curative laser beam scanning through a pool of photopolymer liquid. Instead of feeding sequential pages as in a two-dimensional printer, the build area, or the area where commonly a stack of paper would be found, would move downwards on a z-axis (vertically) to accommodate the next subsequent layer, or instead the print head holding-mechanism will move upwards on the z-axis after the completion a subsequent layer, atop the previous one, after it has been completed.

There is a plurality of processes that sequentially deposit material. Moreover, recently the meaning of the term has expanded to encompass a wider variety of techniques, such as ink jet-, extrusion-, and sintering-based processes. Generally, the terms "Additive Manufacturing" and "3D Printing" are interchangeable parlance for any method of 3D object creation, generally via computer aided design. In addition, it is commonly called, "Rapid Prototyping" (RP).

Early Additive Manufacturing, (abbreviated as "AM"), equipment and materials were first developed in the 1980's. For example in 1981, Hideo Kodama of Nagoya Municipal Industrial Research Institute invented two AM fabrication methods of a three-dimensional plastic model with photo-hardening polymer, wherein the UV-exposure area is controlled by a mask pattern, or the scanning fiber transmitter.

Then in 1984, Charles Hull of 3D Systems Corporation developed a prototype system based on this process known as "Stereolithography," in which layers are added by curing photopolymers with ultraviolet light lasers. Hull defined the process as a, "system for generating three-dimensional objects by creating a cross-sectional pattern of the object to be formed," but this had been already invented by Kodama. Hull's important contribution to 3D printing is the design of the STL (STereoLithography) 3D printing software file format widely accepted by most users, as well as the digital slicing and infill strategies common to many processes today.

The term "3D Printing" originally referred to a process employing customized inkjet print heads to deliver materials for building objects.

The technology used by most 3D printers to date—especially hobbyist and consumer-oriented models—is fused deposition modeling (FDM), a specialized micro-application of thermoplastic extrusion.

Any AM process for metal sintering or melting, (such as selective laser sintering, direct metal laser sintering, and selective laser melting), was generally referred to by its specific nomenclature in the 1980's and 1990's. Nearly all metalworking production at the time was by casting, fabrication, stamping, and machining; even though automation was frequently applied to those technologies, (such as by robot welding and CNC), the idea of a tool or head moving through a 3D work-envelope transforming a mass of raw material into a desired shape layer by layer, was associated by most people only with processes that removed metal, (Subtractive), rather than adding it, such as CNC milling, CNC EDM, and others.

By the mid-1990's, new techniques for serial layer-wise material deposition were developed at Stanford University and Carnegie Mellon University, including Micro-casting and sprayed materials.

Sacrificial parts, sprues, and support materials had also become more common, enabling the printing of new object geometries with negative space or delicate freestanding parts. Additive AM-type sintering was beginning to take hold as a viable means of metal object creation.

The umbrella term "Additive Manufacturing" gained wider exposure in the decade of the 2000's, as the various additive processes began to mature. With regard to metal, it became clear that soon metal removal would no longer be the only metalworking process done under that type of control. It was during this decade that the term "Subtractive Manufacturing" appeared as a retronym for the large family of machining processes with metal removal as their common theme.

During that time, the term "3D Printing" still generally referred only to the polymer technologies most popular; the term AM was more generally used in metalworking contexts than among polymer/inkjet/Stereolithography enthusiasts. The term "Subtractive" has not replaced the term "machining," instead complementing it when a terminology that covers any removal method is needed.

By the early 2010's, the terms "3D Printing" and "Additive Manufacturing" became overarching descriptors for all AM technologies. Although this was a departure from the earlier technically narrower nomenclatures, the generalization of the term reflects the simple fact that all the technologies employed to build objects share a commonality: The sequential layer-wise deposition of material, adjoining these successive layers throughout a 3D work envelope, under automated control.

Other vernacular terminologies have evolved, which are commonly used as AM synonyms, such as "Desktop Manufacturing (DM)," "Rapid Prototyping (RP)," also common vernacular, "Rapid Manufacturing (RM)," implying the industrial production-level successor to RP, and "On-Demand Manufacturing (ODM)," "Maker," "Solid," and other terms also joined the vocabulary set for the new art of 3D object creation.

The 2010's were the first decade in which metal parts such as engine brackets and large bolts and nuts would be built, (also referred to as "grown"), in job production, rather than having to be machined from bar stock or plate metal.

Current technological advances in 3D printing have grown to include the printing of biological materials, medical devices, dental implants and accessories, and even surgically implantable tissue-based materials.

General Principles

Understanding how the process works requires first that there be an object to print in a format that is translatable to mechanical replication. Thus, first the object to be printed has to be either scanned or created via three-dimensional rendering software. 3D printable models may be created with a computer aided design package, or via a 3D scanner, or via a plain, digital camera, and photogrammetry software. The manual modeling process of preparing geometric data for 3D computer graphics is similar to other plastic parts such as mold making and sculpting. 3D scanning is a process of analysis and collection of topographical, digital data of the surface shape and appearance of a real object. Based on this data, three-dimensional models of the scanned object can then be produced.

Regardless of the 3D modeling software used, the 3D model, (often in .skp, .dae, 0.3 ds or some other format), then needs to be converted to either an .STL or an .OBJ format, to allow the printing software to be able to read it and deposit layers according to the desired build material, desired tolerances and other aspects.

With current technologies, before printing a 3D model from an STL file, the object file must first be examined for "manifold errors," this step being called the "fixup." .STL files that have been produced from a model obtained through 3D scanning are particularly vulnerable to many manifold errors that must be adjusted manually in the file before conversion of the file for printing. Examples of these manifold errors are surfaces that do not connect, or gaps in the models' surface.

Once adjusted, the .STL file needs to be processed by a software stage called a "slicer," which converts the model into a series of thin layers. The layers are generated at the thickness appropriate for the predetermined build material and desired resolution. This produces a "G-code file" containing instructions tailored to a specific type of 3D printer. G-Code is a software language that sends discrete pulses to an electric motor, and thereby allows the user to control machine movement. In 3D printing, it instructs mechanical movement in the machine during the 3D printing process.

Printer resolution describes layer thickness and x/y resolution in dots-per-inch (DPI) or micrometers (μm). Typical layer thickness is around 100 μm (250 DPI)), although some machines can print layers as thin as 16 μm (1,600 DPI)). The x/y resolution is comparable to that of laser printers. The particles created are volumetric pixels, which has generated the term "Voxels," (3D dots), and are generally around 50 to 100 μm, (510 to 250 DPI, or "Voxels Per Inch"—"VPI"), in diameter, the term "VPI" implying that the dimensions would be cubic.

Construction of an object with contemporary methods can take anywhere from several hours to several days, depending on the method used and the size and complexity of the model. This is a long period of time, even for the fastest methods, for the art to be adopted into serial ready-for-sale object manufacturing. Some additive systems can typically reduce this time to a few hours, although it varies widely, depending on the type of machine used and the size and number of models being produced simultaneously.

Errors often occur in the mechanical stage of the object building. These are caused by the print head, which moves along an x/y axis to at times inaccurately deposit material, or from the x, y, or z-axis, the vertical axis of the build surface, to be mechanically moved incorrectly to create mistakes in the object. This mechanical movement is problematic for many kinds of 3D printing.

Traditional techniques, such as injection molding can be less expensive for manufacturing polymer products in high volume quantities, but Additive Manufacturing can be faster, more flexible and less expensive when producing relatively small quantities of parts or custom parts. However, in general it is not fast enough to replace injection molding.

3D printers give designers and concept development teams the ability to produce parts and concept models, often using a desktop-sized printer or a convenient outside Service Bureau, wherein one may find several kinds of 3D printers, and one may choose the material and method suitable to one's needs, both material and budgetary. The cost of the printed prototype, cost and choice of materials, and color capabilities all are decision influencers.

The problem of distortion of built objects has been dealt with in several ways, for example, though the printer-produced resolution is sufficient for many applications, printing a slightly oversized version of the desired object in standard resolution and then removing material with a higher-resolution subtractive process can achieve greater precision, particularly because some distortion of the built object can occur when the materials are fully polymerized or temperature stabilized enough for final dimensional rendering.

Some printable polymers allow the surface finish to be smoothed and improved using chemical vapor processes.

Some additive manufacturing techniques are capable of using multiple materials in the course of constructing parts. These techniques are able to print in multiple colors and color combinations simultaneously, and would not necessarily require painting.

Some printing techniques require internal supports to be built for overhanging features during construction. These supports must be mechanically removed or dissolved upon completion of the build.

In metal printing, 3D printing allows substrate surface modifications to remove aluminum or steel.

Example Processes and Machines

Many different 3D printing processes have been invented since the late 1970's. The printers were originally large, expensive, and highly limited in what they could produce.

A large number of additive processes are now available. The main differences between processes are in the way layers are deposited to create parts, and in the materials that are used.

Some methods melt or soften material to produce the layers, e.g. selective laser melting (SLM) or direct metal laser sintering (DMLS), selective laser sintering (SLS), fused deposition modeling (FDM), or fused filament fabrication (FFF), while others cure liquid materials using different sophisticated technologies, e.g. Stereolithography (SLA). With laminated object manufacturing (LOM), thin layers are cut to shape and joined together (e.g. paper, polymer, metal). Each method has its own advantages and drawbacks.

Printers that work directly with metals are expensive. In some cases, however, less expensive printers can be used to make a mold, which is then used to make metal parts.

There are presently many existing types of three-dimensional prototyping machines that are controlled by computers. Usually a software-aided design platform sends commands to a machine in the form of subdivided two-dimensional frames of material deposition or subtraction, which involves stepper motor movements and/or material nozzle deposition done either by extrusion, jetting as in an inkjet type of precision droplets, or an actinic beam such as an ultraviolet or electron beam scanned mechanically over a sequentially stepped volume of uncatalyzed monomer. Powder sintering from additive layers is also a popular method wherein sequential layers of powder are sintered by jetted liquids or by heat from a scanning laser. Each of the present three dimensional prototyping types of machines have various advantages for various markets but they have inertial speed limitations due to the mechanical carriage assemblies which are involved in the material deposition or subtraction process. This new machine design, apparatus and method will be able to greatly and even exponentially surpass the present speeds of three dimensional prototyping machines, largely by eliminating the mechanical apparatus most responsible for taking the most time depositing or subtracting sequential layers of object material.

Key problems with conventional methods and designs include: slowness of build, mechanically complex machines, limited materials, limited material selection, weak or brittle materials, requirement for after-processing, distortion, lack of photorealistic color, cumbersome mechanical housings, complicated electronics, expensive, not user-friendly, and most significantly, not cost effective enough, fast enough, or accurate enough for industrial ready-for-sale manufacturing.

Examples of extrusion methods include and fused Deposition Modeling (FDM), Fused Filament Fabrication (FFF). These generally use thermoplastics, eutectic metals, edible materials, rubbers, modeling clay, metal clay (including precious metal clay), wherein filament or material is fed through a melting head, which then deposits molten plastic and it hardens as it cures.

Robocasting or Direct Ink Writing (DIW). These generally use ceramic materials, Metal alloy, cermet, metal-matrix composite, ceramic matrix composite.

Light Polymerized: Stereolithography (SLA) photopolymer, and Digital Light Processing (DLP) photopolymer.

Photopolymers are cured using a laser UV light source, which traces the object on the x/y place and the stacks layer in a z direction drop the previously cured layer.

Powder Bed includes the powder bed and inkjet head 3D printing (3DP). This can use almost any metal alloy, powdered polymers, and plaster, for example.

Electron-beam melting (EBM) can use almost any metal alloy including Titanium alloys.

Selective laser melting (SLM) can use titanium alloys, cobalt chrome alloys, stainless steel, and aluminum.

Selective Heat Sintering (SHS) can use thermoplastic powder.

Selective Laser Sintering (SLS) can use thermoplastics, metal powders, ceramic powders, photopolymers.

Direct metal laser sintering (DMLS) can use many metal alloys, but we must differentiate DMLS from EBM (electron beam melting), which requires a vacuum and avoids most severe oxidation effects. DMLS has many exceptions for metals because of oxidation problems.

Laminated includes laminated object manufacturing (LOM) using paper, metal foil, plastic film.

Electron Beam Freeform Fabrication (EBF3) can use almost any metal alloy

Extrusion Deposition

Fused deposition modeling (FDM) was developed by S. Scott Crump in the late 1980's and was commercialized in 1990 by Stratasys. After the patent on this technology expired, a large open-source development community developed and both commercial and DIY variants utilizing this type of 3D printer appeared. As a result, the price of this technology has dropped by two orders of magnitude since its creation.

In fused deposition modeling, the model or part is produced by extruding small beads of material, which harden immediately to form layers. A thermoplastic filament or metal wire that is wound on a coil is unreeled to supply material to an extrusion nozzle head, (3D printer extruder). The nozzle head heats the material and turns the flow on and off. Typically stepper motors or servo motors are employed to move the extrusion head and adjust the flow. The printer usually has three axes of motion (x/y/z). A computer-aided manufacturing (CAM) software package is used to generate the G-Code that is sent to a micro-controller, which controls the motors. Extrusion in 3D printing using material extrusion involves a cold end and a hot end.

Various polymers are used, including acrylonitrile butadiene styrene (ABS), polycarbonate (PC), polylactic acid (PLA), high-density polyethylene (HDPE), PC/ABS, polyphenylsulfone (PPSU), and high impact polystyrene (HIPS). In general, the polymer is in the form of a filament fabricated from virgin resins. There are multiple projects in the open-sourced community aimed at processing post-consumer plastic waste into filament. These involve machines used to shred and extrude the plastic material into filament.

FDM is somewhat restricted in the variation of shapes that may be fabricated. For example, FDM usually cannot produce stalactite-like structures, since they would be unsupported during the build. Otherwise, a thin support must be designed into the structure, (a sprue), which can be broken away during finishing. Fused deposition modeling is also referred to as fused filament fabrication (FFF) by companies who do not hold the original patents as does Stratasys.

Binding of Granular Materials

Another 3D printing approach is the selective fusing of materials in a granular bed. The technique fuses parts of the layer and then moves downward in the working area, then adding another layer of granules and repeating the process until the piece has built up. This process uses the un-fused media to support overhangs and thin walls in the part being produced, which reduces the need for temporary auxiliary supports for the piece. A laser is typically used to sinter the media into a solid. Examples include selective laser sintering (SLS), with both metals and polymers (e.g. PA, PA-GF, Rigid GF, PEEK, PS, Alumide, Carbonmide, elastomers), and direct metal laser sintering (DMLS).

Selective Laser Sintering (SLS) was developed and patented by Dr. Carl Deckard and Dr. Joseph Beaman at the University of Texas at Austin in the mid-1980's, under sponsorship of DARPA. A similar process was patented without being commercialized by R. F. Householder in 1979.

Selective laser melting (SLM) does not use sintering for the fusion of powder granules, but will completely melt the powder using a high-energy laser to create fully dense materials in a layer-wise method that has mechanical properties similar to those of conventional manufactured metals.

Electron beam melting (EBM) is a similar type of additive manufacturing technology for metal parts (e.g. titanium alloys). EBM manufactures parts by melting metal powder layer by layer with an electron beam in a high vacuum. Unlike metal sintering techniques that operate below melting point, EBM parts are fully dense, void-free, and very strong Another method consists of an inkjet 3D printing system. The printer creates the model one layer at a time by spreading a layer of powder (plaster, or resins) and printing a binder in the cross-section of the part using an inkjet-like process. This is repeated until every layer has been printed. This technology allows the printing of full color prototypes, overhangs, and elastomer parts. The strength of bonded powder prints can be enhanced with wax or thermoset polymer impregnation.

Laminated Object Manufacturing

In some printers, paper can be used as the build material, resulting in a lower cost to print. During the 1990's, some companies marketed 3D printers that cut cross sections out of special adhesive-coated paper using a carbon dioxide laser, and then laminated them together.

In 2005 Mcor Technologies Ltd. developed a different process using ordinary sheets of office paper, a tungsten carbide blade to cut the shape, and selective deposition of adhesive and pressure to bond the prototype.

There are also a number of companies selling printers that print laminated objects using thin plastic and metal sheets.

Stereolithography

Stereolithography was patented in 1986 by Charles Hull. Photopolymerization is primarily used in Stereolithography (SLA) to produce a solid part from a liquid. SLA uses a laser beam to selectively cure photosentitive liquid into the desired form in sequential x/y layers. Stereolithography (SL) is widely recognized as the first 3D printing process and first to be commercialized. SL is a laser-based process that works with photopolymer resins that react with the laser and cure to form a solid in a very precise way to produce very accurate parts. It is a complex process, but simply put, the photopolymer resin is held in a vat with a movable platform inside. A laser beam is directed in the x/y axes across the surface of the resin according to the 3D data supplied to the machine (the .stl file), whereby the resin hardens precisely where the laser hits the surface. Once the layer is completed, the platform within the vat drops down by a fraction (in the z axis) and the subsequent layer is traced out by the laser. This continues until the entire object is completed and the platform can be raised out of the vat for removal.

Because of the nature of the SL process, it requires support structures for some parts, specifically those with overhangs or undercuts. These structures need to be manually removed.

In terms of other post processing steps, many objects 3D printed using SL need to be cleaned and cured. Curing involves subjecting the part to intense light in an oven-like machine to fully harden the resin.

Stereolithography is generally accepted as being one of the most accurate 3D printing processes with excellent surface finish. However limiting factors include the post-processing steps required and the stability of the materials over time, which can become more brittle.

Solid Ground Curing (SCG), also known as the Solider Process, is a process that was invented and developed by Cubital Inc. of Israel. The SGC process uses photosensitive resin hardened in layers as with the SLA process. However, in contrast to SLA, the SGC process is considered a high-throughput production process. The high throughput is achieved by hardening each layer of photosensitive resin at once rather than tracing it one row at a time. Many parts can be created at once because of the large workspace and the fact that a milling step maintains vertical accuracy. Wax replaces liquid resin in non-part areas with each layer so that model support is ensured.

These processes were a dramatic departure from the "photosculpture" method of Francois Willéme (1830-1905), developed in 1860. The "photosculpture" method consisted of photographing a subject from a variety of equidistant angles and projecting each photograph onto a screen, where a pantograph was used to trace the outline onto modeling clay.

DLP—or digital light processing—is a similar process to stereolithography in that it is a 3D printing process that works with photopolymers. The major difference is the light source. DLP uses a more conventional light source, such as an arc lamp, with a liquid crystal display panel or a deformable mirror device (DMD), which is applied to the entire surface of the vat of photopolymer resin in a single pass, generally making it faster than SL. Also like SL, DLP produces highly accurate parts with excellent resolution, but its similarities also include the same requirements for support structures and post-curing. However, one advantage of DLP over SL is that only a shallow vat of resin is required to facilitate the process, which generally results in less waste and lower running costs. The EnvisionTEC Perfactory is an example of a DLP rapid prototyping system.

Inkjet printer systems like the Objet PolyJet system spray photopolymer materials onto a build tray in ultra-thin layers, (between 16 and 30 µm), until the part is completed. Each photopolymer layer is cured with UV light after it is jetted, producing fully cured models that can be handled and used immediately, without post-curing. The gel-like support material, which is designed to support complicated geometries, is removed by hand and water jetting. It is also suitable for elastomers. Ink jet printing of objects has become more rapid with the use of multiple heads or Multi-Jet Printing (MJP).

Ultra-small features can be made with the 3D microfabrication technique used in multi-photon-photo-polymerization. This approach uses a focused laser to trace the desired 3D object into a block of gel. Due to the nonlinear nature of photo excitation, the gel is cured to a solid only in the places where the laser was focused while the remaining gel is then washed away. Feature sizes of under 100 nm are easily produced, as well as complex structures with moving and interlocked parts.

Yet another approach uses a synthetic resin that is solidified using LEDs. In Mask-image-projection-based stereolithography a 3D digital model is sliced by a set of horizontal planes. Each slice is converted into a two-dimensional mask image. The mask image is then projected onto a photocurable liquid resin surface and light is projected onto the resin to cure it in the shape of the layer. The technique has been used to create objects composed of multiple materials that cure at different rates. In research systems, the light is projected from below, allowing the resin to be quickly spread into uniform thin layers, reducing production time from hours to minutes. Commercially available devices such as Objet Connex apply the resin via small nozzles.

DESCRIPTION OF EXAMPLE EMBODIMENTS ILLUSTRATING THE INVENTION

Figure 1:
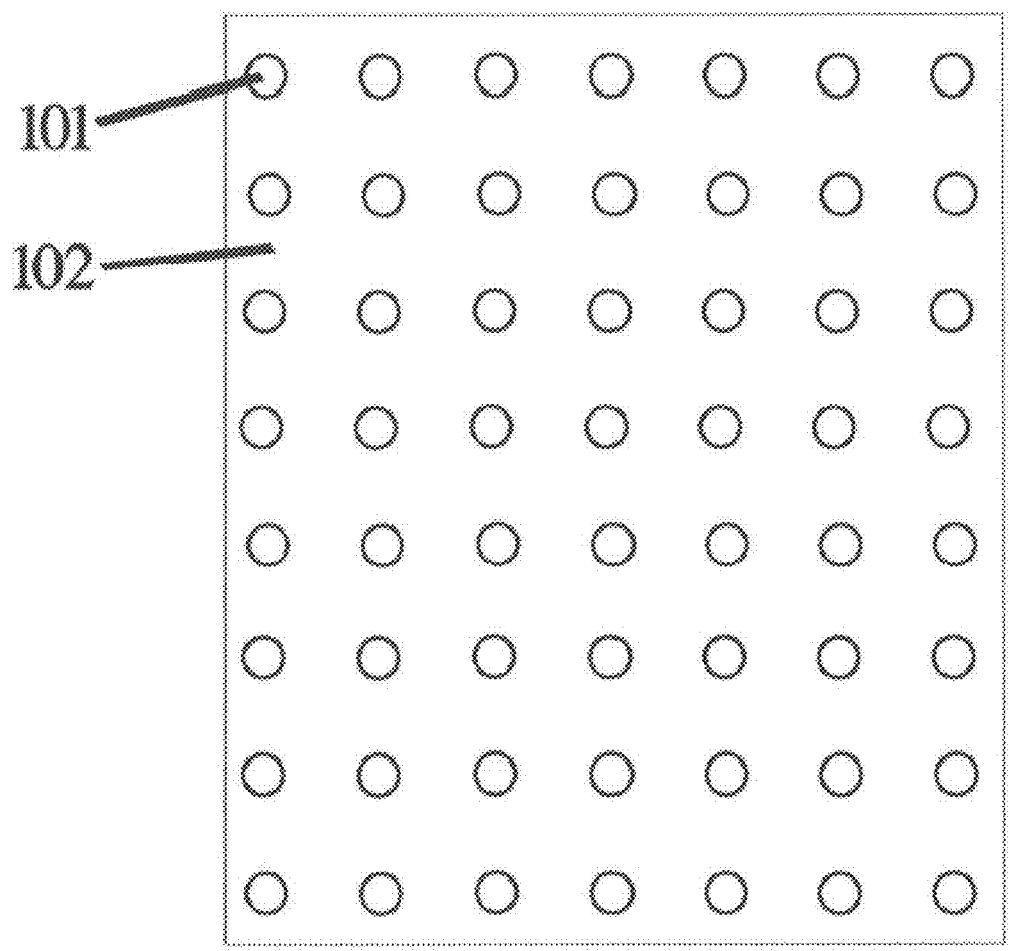
FIG. 1 illustrates a top view example of a capillary array.

According to several embodiments, a device leverages several established electromechanical, chemical, and fluidic technologies to create a novel method of producing three-dimensional objects at orders of magnitude faster than current methods, and with greater materials variety and strength.

In such embodiments, a continuous pressurized laminar flow of liquid reactive monomer passes through the underside of a porous non-reactive surface, which is defined in this art as an extrusion platen.

Upon this extrusion platen is a curative matrix. A curative matrix can include a two dimensional indexable grid of excitable locations. The curative matrix an be described as having a matrix of indexable locations defined by a row (x-index) and a column (y-location) according to a Cartesian coordinate system. A Cartesian coordinate system, for example, may refer to a coordinate system that specifies each point uniquely in a plane by a pair of numerical coordinates, which are the signed distances from the point to two fixed perpendicular directed lines, measured in the same unit of length. Each reference line is called a coordinate axis or just axis of the system, and the point where they meet is its origin, usually at ordered pair (0, 0). The coordinates can also be defined as the positions of the perpendicular projections of the point onto the two axes, expressed as signed distances from the origin.

The curative matrix can also be described by another coordinate system, such as a polar coordinate system. A polar coordinate system refers to a two-dimensional coordinate system in which each point on a plane is determined by a distance from a reference point and an angle from a reference direction.

The reference point (analogous to the origin of a Cartesian system) is called the pole, and the ray from the pole in the reference direction is the polar axis. The distance from the pole is called the radial coordinate or radius, and the angle is called the angular coordinate, polar angle, or azimuth.

According to the two dimensional array in the Cartesian row/line system, the intersection of a row and line can define an activation location. The activation location can be the smallest addressable element in an all points addressable activation matrix; so the defined location of the activation locations within the curative matrix can refer to the smallest controllable location of the individual activation locations within the curative matrix. According to embodiments of the present invention, activation of curable material at multiple activation locations within the two dimensional array of addressable activation locations can be simultaneously, substantially simultaneously, or rapidly activated without mechanical movement of the extrusion platen.

Rather, a first two-dimensional layer of curable material can be addressed and activated at multiple discrete locations in the two-dimensional array of the curative matrix prior to mechanical movement of the extrusion platen. Activation of the curable material at each addressable location can be a result of light and/or heat generated at each location to which an activation signal is sent.

Thus, where a 10 row and 10 column curative matrix is used, a first activation signal can be addressed to a first row (any of rows 1-10) column (any of columns 1-10) location. When the first activation signal causes heat and/or light, for example, activation at that addressable location, a curable material is activated (e.g. at least partially or fully cured) corresponding to the first location.

Simultaneously, a second activation signal can be addressed to a second row and second column location that is different from the first row and column combination. When the second activation signal causes heat and/or light, for example, activation at the second location, a curable material is activated corresponding to the second location.

Thus, any number of the possible two-dimensional locations of the curative matrix are addressed, thereby activating the curable material at each addressed location.

After desired locations of curable material are addressed and activated, and a particular layer of an object is completed, the extrusion platen remains stationary and a Z-stage, to which the build object has been affixed, is advanced in a perpendicular direction in order to form a subsequent layer.

Next, this subsequent layer is made by once again addressing desired locations of the curative matrix, thereby activating the curable material at each addressed location. All subsequent layers are made in two-dimensionally indexible arrays of curable material, thereby rapidly forming a two-dimensional layer of an object with only one directional mechanical movement of the Z-stage perpendicular to the stationary addressable extrusion platen in a layer-wise fashion.

Thus, a three dimensional build can be rapidly made in an at least partially two-dimensionally addressable layer-wise fashion as the Z-stage advances perpendicularly to the stationary extrusion surface of the extrusion platen.

Referring to the Cartesian system, the curative matrix can be a screen-like electroconductive matrix that is attached to a top surface of the extrusion platen. The curative matrix is selectively electronically addressed at coordinates that represent requisite geometry of the cross section of the layer of the object to be created, much in the way a bitmap defines the shape of a two-dimensional object.

According to some embodiments, the invention includes a curative conductive matrix atop an extrusion platen wherein an entire plane of voxels is cured simultaneously. One key to such embodiments is the fact that no longer are single or multiple droplets or rows of material deposited via a mechanical process to create a cross section layer of a build object. Instead, an entire layer is simultaneously deposited and cured in position at the exact geometry required. This is achieved by a novel means via the novel build platen disclosed and illustrated herein.

According to several embodiments, the entire curative matrix can be addressed at once, via a row-and-column "video driver" type configuration, and at speeds and process similarly to a television screen frame rate, rather than tracing x/y coordinates one row at a time system. As the curative matrix is addressed with current, a resistive layer, which has been constructed between the x/y traces of the matrix is activated at the x/y intersection coordinates, and because the current is sufficient where the addressed x and y currents intersect, the resistive layer thereby creates heat in that selected spot/location of the curative matrix. In such embodiments, this heat creates a catalysis event in the monomer at the designated coordinates, thereby creating a voxel in that space out of the monomer passing therethrough. A voxel represents a value on a regular grid in three-dimensional space. As with pixels in a bitmap, voxels themselves do not typically have their position, (their coordinates), explicitly encoded along with their values. Instead, the position of a voxel is inferred based upon its position relative to other voxels (i.e., its position in the data structure that makes up a single volumetric image). In contrast to pixels and voxels, points and polygons are often explicitly represented by the coordinates of their vertices. A direct consequence of this difference is that polygons are able to efficiently represent simple 3D structures with lots of empty or homogeneously filled space, while voxels are good at representing regularly sampled spaces that are non-homogeneously filled.

The addressing of the curative matrix leverages flat screen digital passive matrix electronics to create entire build layers at refresh rates similar to those of a digital display or flat screen television, e.g. 30 to 120 times per second, or faster in some embodiments. The continuous laminar flow of monomer ensures the rate of layer cure is coordinated with the pressure and viscosity as the monomer passes though the extrusion platen, and the movement of the Z-stage is also coordinated therewith. By controlling the current level via addressing programming, the level of resistive heat can be regulated to create several useful and integral states of cure of the monomer voxel itself, such as "self-valving" as disclosed and described herein. Self-valving can refer to a controlled and/or desired situation where a partially cured monomer will close the aperture corresponding to the selected coordinates where no build is required, support structures, and the build object itself. Self-valving can also create an "envelope" for the build within.

Thus, significant embodiments of the present invention provide a Cartesian (or other type or pattern) matrix of electrically addressed array of conducting traces affixed to the flat surface of the build platen. Again, the build platen being porous, having tubes there through, or other channels extending through the depth to allow the curable material to flow from one side of the build platen to another side of the build platen.

According to these embodiments, the build platen has multiple serially addressable arrays, or matrices, for energy triggered selective voxel imaging and/or heat polymerizations. In some embodiments, the build platen is preferably porous because non-porous surfaces would require much longer times for a meniscus of liquid build material to stabilize from side injected ports into a flat uniform build layer. The purpose of the Build Platen is to provide sufficient porosity to greatly shorten the layer formation time. The liquid build material is pressurized or biased to be continuously transported or extruded across a short area through the porous region of the platen and onto the surface wherein lies the Cartesian grid of traces, the matrix, thus saving time otherwise spent from a longer distanced side injected configuration.

In its basic embodiment, a passively addressed electroconductive or conductive Cartesian matrix is selectively addressed so that the liquid is extruded much in the way a video is addressed, and as it passes through the porous build platen it is selectively cured to create the specific geometry of that build layer.

Active performance can be achieved utilizing a uniformly passivated oxide layer other uniform material which is integrated between the crossed intersections of conducting x and y traces, and will selectively provide resistance heating or light energy in a manner analogous to a flat screen display, but for this purpose for catalysis or phase separations of thermoset or thermoplastic differentiation.

Successive layers can thus be applied using this build platen and a vertically controlled Z-direction articulated stage, which can be mechanically sequenced to move away from the build platen's surface as measured precise layers are sequentially addressed with new material forced through the platen.

In some embodiments, the single mechanical Z-stage may offer a binding surface so that the build material will have additional means of being drawn away from the build platen's surface. The build platen in turn, can be coated by a non-stick release coating such as Teflon, silicone or an inorganic material such as boron nitride for the purpose of allowing successively released layers to be moved away from the build surface.

The build platen may also be made acoustically live also for the purpose of aiding in the release of successive layers from the platen. The platen may have a magnetic or electric field applied for the purpose of aligning composite dispersed material or molecularly sensitive molecules using field-aligning effects.

The simplest embodiment is comprised of an open cell substrate of an inert material, with the conductive traces bonded on one side in an addressable array, which allows a heat signature to be applied selectively by the traces in an image defining manner layer upon sequential layer. Other relatively more complex embodiments of the platen may include a photo conducting pad such as cadmium selenide and others between the conducting traces, allowing variable heat control from a corresponding light image focused on the side opposite the traces.

Where the platen is comprised of an array of fused parallel hollow light-guide fiber-optic sections, the porosity of the platen not only will conduct liquids to the trace array side, but varying intensities of light, transmitted through these same light-guide fiber-optics can render a wide range of conducting variability to the electrical energy being transmitted between the orthogonal traces.

Secondary dye- and/or catalyst-embedded trace arrays can also be placed as a replaceable accessory on the opposite side of the traces in close proximity to the bottom surface of the platen, for the purpose of allowing reel-to-reel indexing/alignment to coordinate with imaging colors and material choices. This can generate photorealistic color. The secondary dye and/or catalyst embedded web-addressable material would preferably be a material such as paraffin, which has a lighter density than the build monomer materials, having a lower melting point, thus allowing for vertical diffusion up through the build platen, and probably not necessarily consisting of as high a resolution as the actual polymerized finished object.

UV inorganic LEDs may also be placed as micro-actinic sources sandwiched between the traces for the purposes of localized curing. Thus, a photo-chemical result of an activating energy can be addressed according to the matrix. Generally the term Actinic refers to electron bombardment or ion bombardment, however in general Actinism is the property of light, including visible light, radiation that leads to the production of photochemical and photobiological effects. Actinic chemicals can include silver salts, such as are used in photography and other light-sensitive chemicals.

In addition to UV catalysis, heat curable monomers have a variety of blocked catalyst moieties available for the purpose of a wide range of polymerization reactions.

The liquid monomer that is passing through the platen is of a low enough viscosity to move freely. In some embodiments, is uses Selective Addition Polymerization via in situ Latent Heat Catalysis. The monomer contains a catalyst, which will not be activated until the desired temperature has been reached for cure, otherwise known in the art as a latent heat catalyst. In some embodiments, epoxy formulations, utilizing lewis acid amine blocked salts, with various known accelerators such as vinyl ethers, Styrene, acrylate acrylated polyurethanes and other polymerization systems, which can be initiated by lightly bonded (blocked) via free radical liberation such as peroxides, various blocked poly isocyanates can also be used in situ with polyurethane and urethane/epoxy modalities as well as unsaturated polyesters as co-polymers wherein said benefits of impact resistance hardness or flexibility characteristics are of special interest, all can be deposited from a relatively inactive state onto a staged environment wherein elevated activating temperatures commence local polymerizations. This particular approach to additive manufacturing, otherwise known in the art as 3D printing or rapid prototyping, has many advantages, which include: less energy for curing and more liberal considerations for opacifying pigments or composite additives.

Such mechanisms for delivery include the current subject invention, and in addition ink jet deposition, nozzle extrusion, repeated lithographic applications, silkscreen or masked templates such as a stencil. Repeated applications to match desired cure rates can be matched to the various chemistries, which may be employed. In some embodiments, such as ink jet use of this chemistry method, the liquids can be used in opaque or transparent materials, with RGB or CMYK, or other color dye or pigments added so that discrete droplet deliveries can create photorealistic color in transparent or opaque versions, which is more difficult in UV catalysis, since color impedes the curing when UV is blocked, as is the case with color and opacity.

To create support structures with the latent heat catalyzed monomer, there is also the ability to impede crosslinking of the monomer/oligomer chemistries, by secondary pre-applied chemical inhibitors for the creation of negative spaces, which may be supportive but not otherwise considered structural for the end product. These may be easily removed in a post-manufacturing cleaning step. The selected material used to impede the polymerization of the monomer be locally introduced by the same colorizing mechanism aforementioned, and can have a discrete heat signature or other activation method to create these selective support materials such as gel, in a compromised polymerization, a sand granule or other support.

According to some embodiments, the platen is constructed with the hollow capillaries thinly metalized as resistance heat elements and a second addressable orthogonal trace structure on the opposite side of the platen, for the purpose of heating the entire capillary for the purpose of selective thermoplastic extrusion.

Ionic liquids bearing various dissolved metals are also employed in the matrix for the purpose of selective image deposition by means of local voltage differentiated electrolysis upon the image architecture of the platen in some embodiments.

Additional material chemistry applications for this invention have been discovered in view of the variety of epoxy, acrylics, polyurethanes, metals and bio-compatible materials. As the complexity of application rises however, the expense of the platen rises for different curing mechanisms.

In some embodiments, the platen itself may include auxiliary temperature controls, volume sensitive pumps, a galvanometer to ascertain local material densities, ultrasonic transducers, a precisely indexed single-stage apposite platen to draw material away from the imaging platen, a wash tank for excess or contaminated materials and a neutralizing chemistry accounting for environmentally responsible disposal.

The voxel platen, methods for making the platen, and components thereof.

There are a plurality of ways in which to create the voxel platen, however many involve orderly arrays so that proper row and column addressing can be achieved. In a preferred embodiment the voxel platen is constructed as follows:

A bundle of fiber optic cables that are made of borosilicate or other type of glass are heat-sintered together in a group that creates the desired shape. This can be referred to as a "loaf." The cables can be organized to create a Cartesian (orthogonal) alignment, which is one preferred embodiment. The bundle of fiber optic cables can also be bundled to create hexagonal or other types of patterns with cross-sectional geometries in addition to circular, tubular, elliptical, rectangular, square, and hexagonal. For the purpose of the a first advantageous embodiment, Cartesian methods would be utilized to facilitate row and column addressing and later bitmapping of images in an interface software.

By way of explanation on the sintering of the fiber optic cables, solids do not transition to liquids at one time. They transition in phases, therefore the exterior of the fiber optic cable begins to liquefy before the inside of the cable. This creates an adhesion layer on the outside of the cables. When this loaf is created, it is then cooled and removed from its encasement. It can be created at nearly any dimension as desired, ranging from several millimeters to several feet. For the purpose of this invention and in several preferred embodiments it would be anywhere from 150 cm×150 cm up to 300 cm×300 cm width, and the preferred length of the loaf to generate the number of desired platens to be created, and to be cost effective for the manufacturing processing required.

After the loaf has been sintered and cooled, it is sliced via various means appropriate for glass, polished, and if the fiber optic cables were not hollowed, it is etched via acid or other appropriate solvent, or if the fiber optic cables were hollow, it is called the Extrusion Platen, and it will then be ready to be constructed into the voxel platen.

As pertains to acid etching, if the fiber optic cable is not hollow and merely represents a refractive gradient cross section, the higher alkaline core selectively etches first, making it easy and controllable to selectively etch the center out of the cable, as is known in the glass art.

Sintering the fiber optic cables together means that though the fiber optic cables remain intact whether they are hollow or filled, only the outer surface of the fiber optic cable adheres to the one next to it, thereby creating a bond during the heat sintering process. They remain intact and in place to create an extremely precise capillary-aligned Extrusion Platen with minimal tolerance variation.

This is a process in the glass art as is practiced for genomics, general and chemical assay processes, bioassay, night vision optics, scintillation photo electric chambers, etc. However, the use of cross-sectional fiber optic porous glass for the purposes of creating three-dimensional objects is novel, and is claimed in this invention as the extrusion Platen.

When the glass loaf has been sliced into cross-section and polished, the holes created therein are referred to as capillaries.

The slicing of the loaf by various means appropriate to the art, such as diamond saws, common to the art in silicone manufacturing arena, water jet cutting, or other means, is effected avoiding the generation of canting or convex surfaces on the glass, to ensure flatness. Final leveling is generally completed via a polishing process common in the glass art. This finish process assures micrometer accuracy for the build process, which will later occur thereupon.

The smaller size platens can be tiled to increase the overall platen size and supported via coffering underneath, preferably with another section of platen that has been laid between the seam of the tiled platens, and capillary holes on the same centers but larger and etched to align with the holes of the platen above and indium heat bonded together. The capillary holes would be consecutively larger with each layer of support to prevent the need for increased pressure from the future monomer manifold below. Other means to coffer the tiled Extrusion Platen would also be precision knife-edge glass to support the tiled porous glass, similar to wing ribs or roof trusses, creating a larger continuous Extrusion Platen. In this fashion, larger and larger finished Voxel Platens can be created, and thus larger finished objects or greater quantities of finished objects can be created in the final device. For the purpose of this explanation, the size of the Voxel Platen is not limiting to its general methods of construction.

It should be noted here in its preferred embodiment the fiber optic cables have capillary hole diameters of 10 µm each. Based on this preferred diameter, they are on 25.4 µm centers, or one mil centers. This is important to note because that means that the resolution or holes per linear inch equals 1000. Since the preferred embodiment has a Cartesian array, the entire Extrusion Platen will have 10 µm holes, 1000 per inch, 15.4 microns between each hole, which equals 1 million capillaries per square inch.

After polishing and etching, the entire platen can be annealed by heating to a temperature whereby internal stresses are relieved, as is known in the art of annealing.

After completion of the glass Extrusion Platen creation, the entire platen is coated with an inhibitor. The inhibitor would consist primarily of nano rutile phase titanium dioxide particles suspended in a sodium silicate solution of very mild concentration and low viscosity, allowed to dry, then fixed with acid. It is then washed with a buffer water solution. This is effected after annealing. This a very thin layer, which inhibits any monomer from curing when in contact with the glass of the Extrusion Platen, which is important since objects must be built only on one side, the surface of the final Voxel Platen.

The inhibitor is a locally polymerization inhibiting layer that protects against runaway polymerization through the platen. It works by slowing down the catalysis reaction of the monomer and raises the reaction threshold to thereby prevent catastrophic occlusions and the monomer's potential dendritic polymerization inside the capillary. There is a plurality of inhibitor options available; nano titanium dioxide is not the only inhibitor, however it is preferred for this embodiment. Others may include hydroquinone, phenoquinone, benzoquinone, boric acid, and others as are known in the Chemical arts. Titanium dioxide is preferred for this embodiment.

After the inhibitor coating has been completed, the capillaries are then filled with wax or other easily removed meltable material to protect them during the electro mechanical assembly and construction phase of the Voxel Platen.

Regarding the traces on the glass includes:

Carrier Film. When a perfectly flat platen has been created and filled, then the first layer of electro-conductive copper traces will be constructed thereupon. This is referred to as the Curative Matrix.

In order to construct a preferred embodiment of the voxel platen, pure electro-conductive copper traces can be created in the following manner. It should be noted that any conductive metal maybe used, however pure copper is the preferred embodiment because it has the highest level of electro conductance of metals available, and because it forms a natural semiconductor oxide layer which will be explained in the next part of this construction description. Alternative materials include transparent electro conductive traces known to the art such as indium tin oxide, which can be employed.

An approximately two millimeter thick piece of polyvinyl butyrate or similar film, such as cellulose, gelatin, or other material that is dissolvable, is employed in this advantageous example. It should be noted here that in other embodiments other materials for carrier film could be used, such as metals, which can be easily vaporized, such as gallium.

Construction of X Traces: For the X traces, or row of traces, a roll of copper is coated on two sides via vapor sputtering or other method known in the art, with adhesive metal(s) such as Indium in its preferred embodiment. The copper will be manufactured at the thickness required for the conductance needed for the heat that is going to be generated, as per the requirements of the selected monomer, which will be used in the building of objects after construction. In general, this will be between a half a mil and one mil thickness (12 to 25 µm thick). Then it will be oxidized on two sides with ammonia It will then be bonded to the carrier film via calendaring. After the carrier film is coated with the appropriate thickness of conductive metal, in this case copper, next it is coated with a conductive adhesive at the thickness required for the material application desired. In its preferred embodiment, this adhesive metal would be indium. This will later serve as a bonding agent as will be explained.

In its preferred embodiment, this copper will be laser ablated using an Excimer laser. Prior to the laser etching and calendaring to the carrier film, both of the metal surfaces will first be coated with an oxidation layer, oxidizing the metal as is known in the art. This will serve as a resistive layer and creates a semiconductor bandwidth layer. When the oxidized metal(s) and adhesive layers have been deposited at the appropriate thicknesses on top of the carrier film, then traces are created utilizing an Excimer laser, which will cut the metals but leave the carrier film intact. This will be important for construction as will be explained.

The average size of the laser-ablated traces is 10 μm however they can be much smaller or larger as the embodiment, conductivity, and chemistries require. The conductive traces are not limited to these sizes, however for the purposes of this embodiment these are preferred.

In addition to a straight cut, the excimer laser can be controlled to angle slightly as the traces are being ablated. In this manner, a pyramid cross section is generated. Thus in construction the portion of the metal in contact with the carrier film will be 10 μm wide, but be angled so that the top surface of the ablated metal will, for example, be 4 to 7 μm in width. The conductive traces are not limited to these sizes, however for the purposes of this embodiment these are preferred.

When straight traces are created, it is the simplest method of construction. After the traces have been laser ablated, the carrier film with the ablated traces is flipped over onto the voxel platen and aligned under a wide field microscope to land on the 15.4μ spaces between the capillary holes. A readily available thermal metal non stick plate such as is used in tee-shirt manufacturing, or to apply decal safety instructions in automobile interiors, as are commonly used to inter-bond plastic layers, is applied to let the indium or other adhesive melt into the glass and thereby bond the entire set of traces directly to the glass in position. Next, a solvent bath is effected to remove the carrier film leaving only the pure copper and indium trace structure directly on the glass.

Angled X Traces: It should be noted here again that the excimer laser can cut the traces in various ways. The first embodiment would have straight cut 10 μm wide traces and since both sides are coated with indium or other adhesive, one would not need to transfer to a secondary film. However, if a smaller contact area is desired at the intersections of traces, then the laser ablation will be done at the desired angle generating a smaller width on the top side of the trace. In this case since it is desired that the larger width section of the trace be in direct contact with the glass, that would necessitate transferring carrier films for the X layer of traces. (It would not be required for the Y layer of traces since they would already have the smaller width trace on top in this instance.) Since the X trace metal(s) are oxidized and adhesive on two sides, then affixed to carrier film, they can be laser etched to whatever size traces are required and used in any direction top or bottom to be affixed to the extrusion platen.

Angled cuts generate a smaller contact area where the traces intersect. The desired effect of the smaller contact area is to create an electroconductive resistive heat moment, which is shorter in duration, due to the fact that that it has a much higher surface to volume ratio. It will also facilitate the movement of the monomer through this passive matrix construction with less resistance for the flow dynamic during the building of voxels.

If the X traces are created in the pyramid or angled shape cross section, then an extra step to invert the traces is needed before affixing the traces to the glass, since the smaller side has to be on top in the finished platen an the Excimer may not always undercut the traces, depending on materials and suppliers employed.

In the case of the angled traces, the first layer will be inverted by heat transference to a second carrier film, the second carrier film being of a higher molecular weight than the first. The 10 μm wide traces with smaller tops are then transferred to the lower molecular weight film via heat transfer. Then the two films sandwich the metals layer with the smaller width on the secondary film. The first carrier film will release from the metals leaving the metals on the second carrier film. Now the carrier film is ready to be flipped over (like a decal) and laid a top the extrusion platen to create the X traces for the Curative Matrix.

The 10 μm wide laser etched traces will be microscopically aligned with the 10 μm capillary holes so that they are in sitting on the 15.4 μm solid area between capillary holes.

The carrier film is then heated so that the in the adhesive melts and affixes to the glass beneath it after it has been aligned. Since both sides of the copper film will be coated with adhesive metal prior to attaching it to the carrier film, the film will be reversible top or bottom.

After the X layer of traces has been bonded to the glass, a solvent bath will be utilized to remove the carrier film. After which, there will be copper and indium conductive X trace layer directly affixed to the Extrusion Platen.

Construction of the Y Traces: The same process is effected for the Y or Column traces. However, in the case of straight or angled traces, they will not need to be transferred to a secondary carrier film.

In addition, prior to the laser etching, the metal surface will first be coated with an oxidation layer, oxidizing the copper into copper oxide with ammonia or other method known in the art, or oxidizing the indium or other selected metal(s). This will serve as a resistive layer and creates a semiconductor bandwidth layer. The passivated oxidation layers where the traces cross allow for a semiconducting band gap, which allows current to flow selectively at any trace junction that requires heat addressing via a final layer of resistive material, which also creates most of the heat via said resistance layer. On top of the oxidation layer, this resistive layer is applied. This is comprised of nano particulate carbon and ceramic materials, which will generate heat when current is present. This is the Y or column layer and does not have to be transferred to a secondary film.

(It should be noted here that the resistive layer can be applied to the X traces instead, as long as the end result is that the two sets of traces' oxidation layers are touching the resistive layer in a sandwich.)

This film is then directly flipped over onto the X layer orthogonally and aligned microscopically so that the cross sections are localized to one edge of each circle of the capillary orifice.

The same process of heating to create a bond to melt the indium is repeated and the Y traces are affixed to the metal layer beneath. Then the solvent bath is repeated to remove the carrier film from the Y traces.

After the X and Y traces, which comprise the Curative Matrix, have been affixed to the Extrusion Platen and the carrier films have been completely removed, the entire mechanism is cleaned and dried via solvent and air. It is then ready for the nonstick coating.

Non-stick Coating: A coating of Teflon, boron nitride or similar material is utilized to coat the Voxel Platen. It coats the entire assembly except for the capillary interiors. They are still protected by their wax coating that was applied after the inhibitor.

As a final finishing stage, after the release coating is completed, it may be necessary to dress the appropriate corners of the intersections with a finished dressed laser ablation, creating a micro-divot, via excimer laser to thin said release layer thereby biasing the heat signature closer to the desired voxel capillary.

When the nonstick coating has been fully applied and cured by CVD or vapor deposition, then the wax will be removed via gentle heat and washing with appropriate solvent, vaporization, pyrolization, or other appropriate method.

Once these steps have been completed the assemblage has become the Voxel Platen, and will be ready for addressing. This entire process can be automated for mass production.

Several illustrations of these machines, portions thereof, and interchangeable aspects are hereinafter discussed with reference to the figures.

"Platen" (used by itself alone). The platen can be referred to as the surface upon which the object is built, in any phase of the platen itself's construction, which can be curved, planar or other shape depending its planned function, with at least one common plane on at least one axis but preferably two. For the purpose of this present invention in its preferred embodiment the platen can be defined as a flat plane. Future embodiments will utilize other shapes of platen depending on purpose and object geometry requirements, depending also on its design purpose. The term Z-stage platen is also used to mean the device which moves perpendicularly to the build plane/platen, and serves as an adhesive platform to move the built object away from the build plane/platen in some embodiments, however it is generally referred to as the Z-stage platen and not as platen alone.

"Extrusion platen." The Extrusion Platen can refer to the platen through which the build material liquid passes. It can be the capillary glass, metal, porous ceramic, stone or other material through which the build material can pass. It is then built thereupon after it has been activated with the curative matrix. It can be configured to encompass the properties and shapes of the platen above. For the preferred embodiments in this specification, it is planar.

"Voxel platen". The build platen can also be referred to as the voxel platen, and also refers to the finished extrusion platen with the Cartesian, polar, or other configuration curative matrix thereupon.

"Curative matrix." The Curative Matrix is a Cartesian or other array of electroconductive traces that serve to generate current, which activates a resistive or reactive layer to cure the monomer build material that passes there through.

FIG. 1 shows an array of capillary tubes of a build platen from a top view. FIG. 1 is a representation of the build platen porous substrate. While there is a plurality of material that can be utilized, one preferred embodiment includes a bundle of fused fiber optic cables, each with an inner diameter of about 8-10 microns, for example. The fiber optic cables are fused and supported then sliced cross-sectionally to become a light transmitting extrusion platen that is impervious, or relatively resistant, to varied temperatures used to cure the material passed there through and can also transmit light for some embodiments. Other materials with which to construct the extrusion platen include granular materials, which offer a fused open celled porous structure such as glass microspheres, sintered sand, and also plastics which have been sintered. The material should be non-reactive and chemically inert, according to some preferred embodiments.

Figure 2:
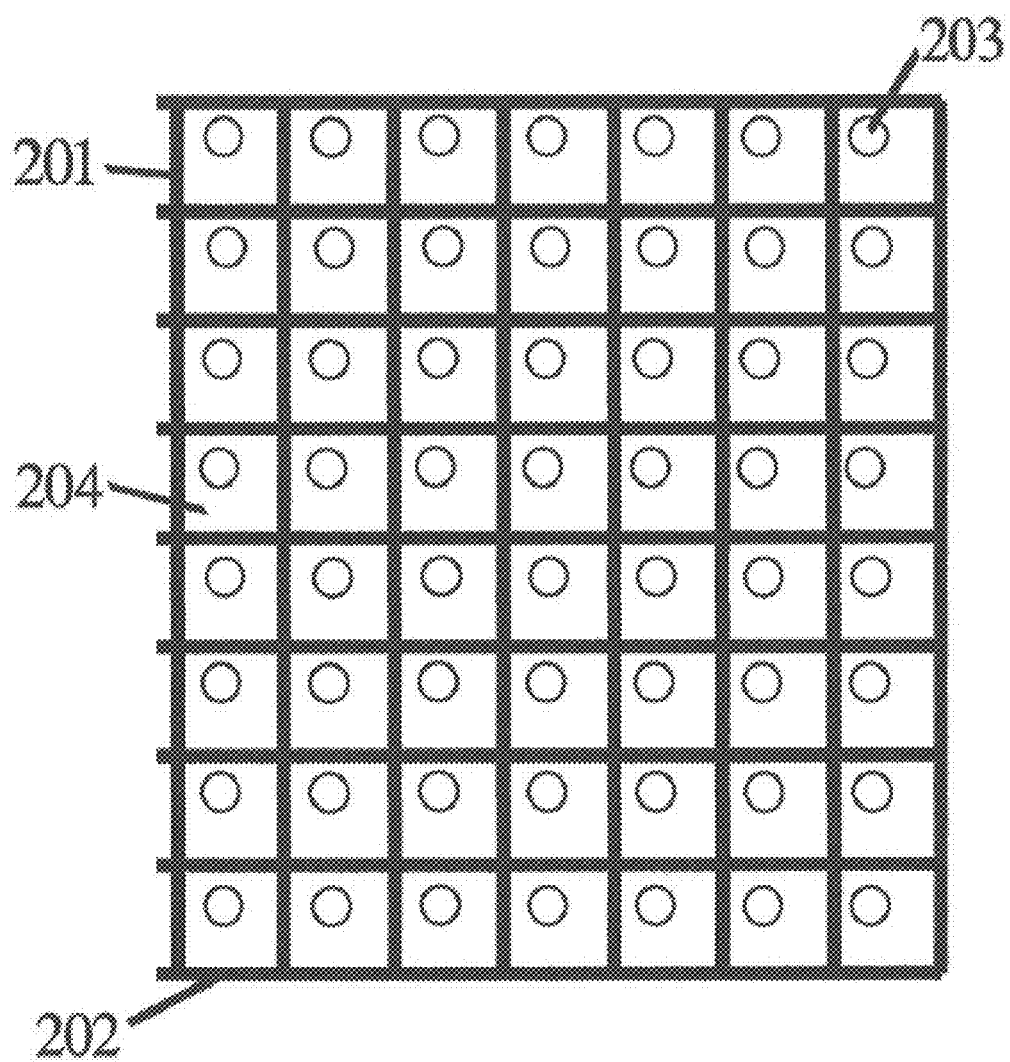
FIG. 2 illustrates a top view example of an activation matrix array.

FIG. 2 is an illustration of the relatively simple platen architecture according to FIG. 1 and other embodiments of the inventions disclosed herein. In FIG. 2, element 201 is a Y-axis (e.g. insulated copper) trace. Element 202 is an X-axis (e.g. insulated copper) trace. Element 203 identifies open micro-tube channels. And element 204 illustrates solid fused tube-support material.

FIG. 2 illustrates a curative matrix including a porous substrate that has been directly coated with a non-stick coating. According to this embodiment, the platen is passively addressed using a digital matrix of copper wires (traces or filaments) orthogonally set and fixed to carry Cartesian plotting of electrical current voltage so that the extruded heat sensitive monomer with a latent catalyst embedded therewith will cure into a voxel at the point of contact between the resistive heat spot on the curative matrix and the liquid. Other embodiments of this matrix include any reactive addressable porous matrix, which can be aligned to cure the extruded monomer or curable liquid in a controlled fashion to create the cross section geometry voxels in an entire layer at once. Thus, any electro-conductive fashion to create the cross-section geometry voxels in an entire layer at once. And, any electro-conductive material, such as including copper, indium tin oxide, which are examples in the flat-screen display industry can be used.

Thus as illustrated in FIG. 2, a passive matrix construction can be used in some advantageous embodiments. This passive matrix construction can be addressed by a video type of signal in a Cartesian multiplex array as discovered by this inventor. The matrix can also be addressed with a VAPM passive matrix SAW MEMs array disclosed by this inventor in U.S. Patent Publication 2009/0051863 A1 as a simplified addressing architecture, and particularly fast and rapid indexing of the matrix and creation of the objects as disclosed herein.

In these embodiments, traces are arrayed at overlapping ninety degree angles and have passivated oxidation layers between which there is a resistive or other reactive layer where the traces cross, which allow for a direct heat conversion via electrical conduction because of the local resistance supplied by the resistive layer between the oxide layers.

Figure 3:
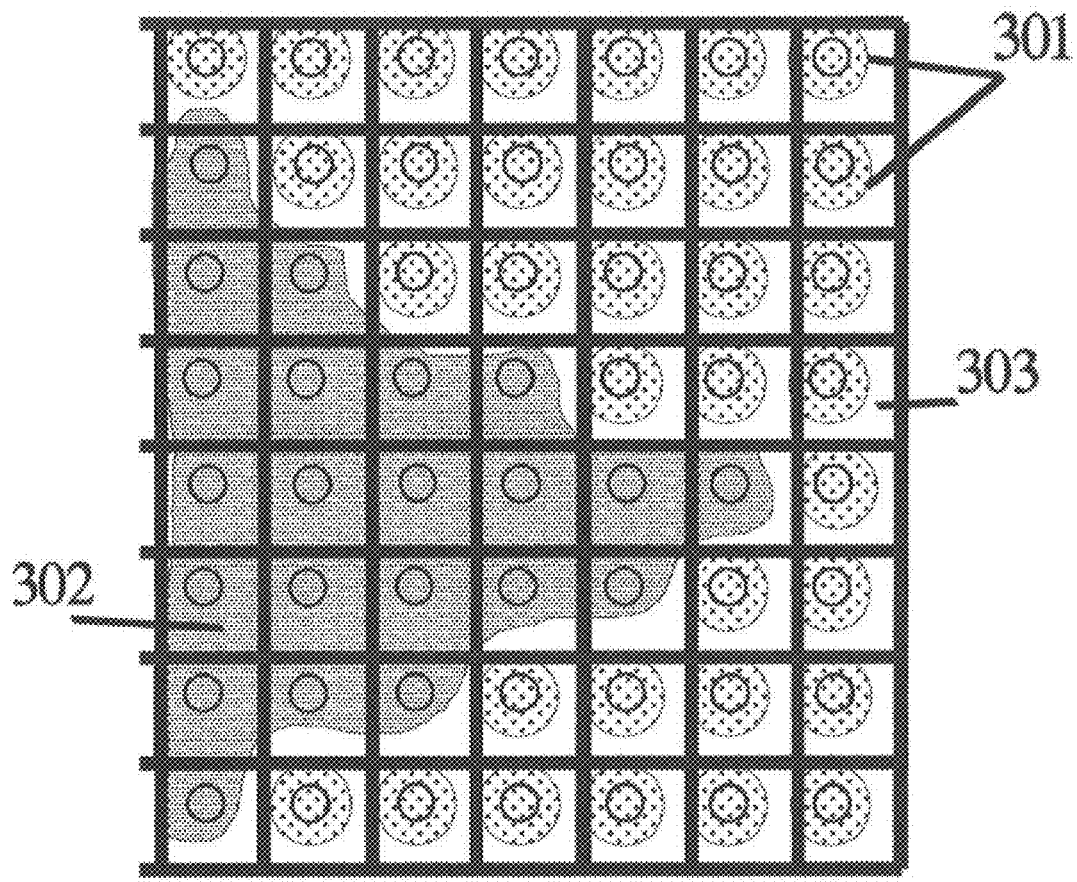
FIG. 3 illustrates a top view example of joined and unjoined voxels.

FIG. 3 illustrates a top view of joined and un-joined voxels according to various embodiments. Element 301 references unjoined polymerized spherules. Element 302 illustrates conjoined polymerized solid cross sections. And, element 303 illustrates uncured monomer.

As shown in FIG. 3, once the build platen has been activated, a pool of pressurized or otherwise pumped latent catalyzed monomer or other catalyzable substance is passed through it. As it passes through the electro conductive matrix selectively cures the monomer into voxels in an entire Cartesian plane all at once thereby creating an entire layer of a build object in less than a second, in many embodiments. In some embodiments it is as fast as ¹⁄₂₀₀ths of a second. Then a Z-stage axis moves the Z-stage platen upwards perpendicular to the build surface to a subsequently determined "correct" increment corresponding with a thickness of the voxel and the next build layer is subsequently created.

In some embodiments sequential planes of voxels are deposited in hundredth s of seconds, and an object builds rapidly in the Z-axis direction (vertically). There can be a Z-axis platen platform elevator above the object that is adhesive and there may be an extra layer in the build object that is assigned an adhesion geometry to secure the built object to the Z-stage elevator until such time as the object is completed and the object is removed from the Z-stage elevator.

Some material in the voxel build may not require the Z-stage elevator and the voxels may build naturally as the pressure from below is naturally pushing upwards. In similar fashion building from the top downwards and letting gravity pull the monomer through the extrusion platen can also be used. Thus, the build object Z-stage would naturally occur as a product of gravity in such embodiments. Thus, these embodiments can depend on the material used in the build process.

Resolutions of $\frac{1}{1000}^{th}$ of an inch and more coarse designs can be achieved with this method depending on how software is programmed to assign the digital signal resolution and the speed and exotherm of chemistry selected. For example, a lower resolution "rough draft" or rough prototype of an object can be assigned a lower resolution and will have less voxel build planes, thus a shorter build time, however chemical properties will be calibrated to coordinate.

Color embodiments are disclosed herein and can be integrated at any time during any of the embodiments according to the various disclosed inventions. In addition, opacifying of a clear curable liquid combination can be used so that opaque and transparent material as well as colors can be used in any combination to create a photorealistic 3D object.

Since the matrix can be addressed like a high definition video screen and the images of each layer of the build geometry can be sequentially addressed throughout the build platen, entire planes of the build object can be deposited as fast as the cure cycle of the monomer will permit. Some of these chemistries produce layers at a rate faster than for a 1 micron voxel thickness curing stacked at 2 mm per second in vertical height. The VAPM or multiplexed digital signaling permits 200 layers per-second to be deposited in a fully cured state. Currently some chemistries' cure times exceed the driver-signaling rate as discovered by the inventor. Hydrodynamic linear motion control can be included as required.

A bifurcated independent unbounded voxel may also be formed continuously with the fused image sections so that support material is always present for local extension or island structures, as shown in FIG. 3. Referring still to FIG. 3, an indexed moving Z-stage platen matching the dimensions of the imaging platen moves independently away from the build section, serving the purpose of maintaining equal depth (e.g. thickness) of layering and a surface for attached solidified material to move in coordinated fashion throughout a build cycle.

FIG. 400 illustrates a side view of the build platen. As monomer is fed through the fused hollow capillaries (e.g. as shown in FIG. 1), dissolved blocked catalyst is activated locally as the monomer emerges near the individually addressed heat source where the traces cross (e.g. as shown in FIG. 3).

Figure 4:
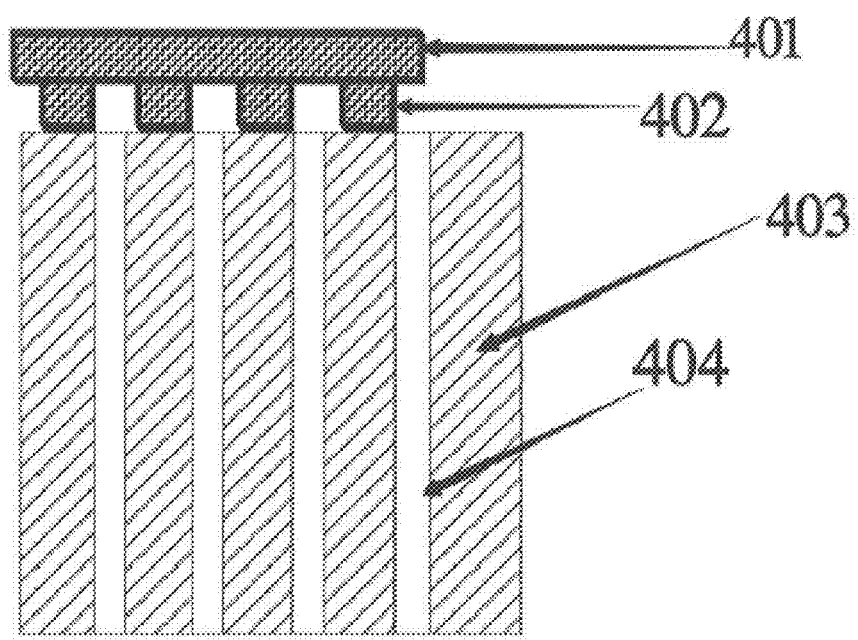
FIG. 4 illustrates a side view example of a capillary matrix.

As shown in FIG. 4, element 401 refers to a 90 degree metal trace array; and element 402 references a 90 degree metal trace array that is perpendicular to metal traces 401. Element 403 references a fused tube support material between the tubes and element 404 references one of several hollow tubes.

FIG. 4 shows an illustration of a side view of the capillary platen with the metal or electro-conductive traces in place. Similarly, from FIG. 3, which is applied to this FIG. 4, however it is to note that these figures are for illustration purposes and actual dimensions may vary in any of the embodiments disclosed herein, but the teachings of the various embodiments of the machines and process are shown and often emphasized for illustration purposes.

Figure 5:
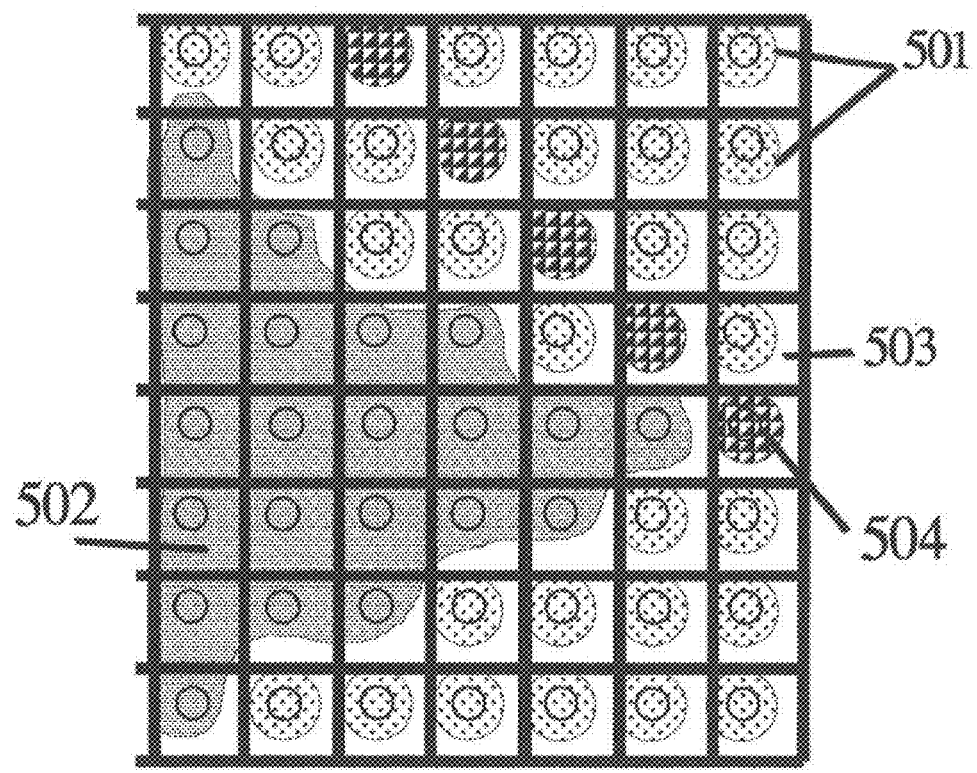
FIG. 5 illustrates a top view example of partially cured voxels.

FIG. 5 illustrates a top view of partially cured voxels. As shown, element 501 references un-joined polymerized spherules. Element 502 references conjoined polymerized solid cross-section. Element 503 references uncured monomer, and 504 references partially cured gelled monomer (e.g. to turn capillary off).

In order to regulate the flow of monomer through the capillary platen, an on-off function can be created using a partially cured voxel of monomer which is created by an incomplete electrical or heat signal form the matrix to make the gelled monomer into a "skin," which prevents the monomer from passing until it has been addressed again and the cure on the voxel has been completed. When the monomer has been only partially cured it has high adhesion, which allows it to stay in situ on the non-stick platen and traces. However, at the time of final cure it loses its adhesive properties and becomes a part of the build item, ready for the next upsurge of fluid to attach and cure thereto.

This can be used to create selective supports for negative space geometries. Another method of supporting negative space geometries includes the creation of selective non-connected voxels in the negative areas to generate a sand bed, which will support the negative space and can be easily disposed of as solid waste.

The uncured monomer appearing in the illustration is the result of un-signaled Cartesian points and can be washed away after the object is fully built or as shown in FIG. 5.

In FIG. 5, the unneeded Cartesian locations can be stopped or skinned over to stop monomer or liquid flow until they are needed, by a partial cure process expounded in FIG. 5. This can eliminate the need for any wasted monomer or liquid in some or most cases.

Figure 6:
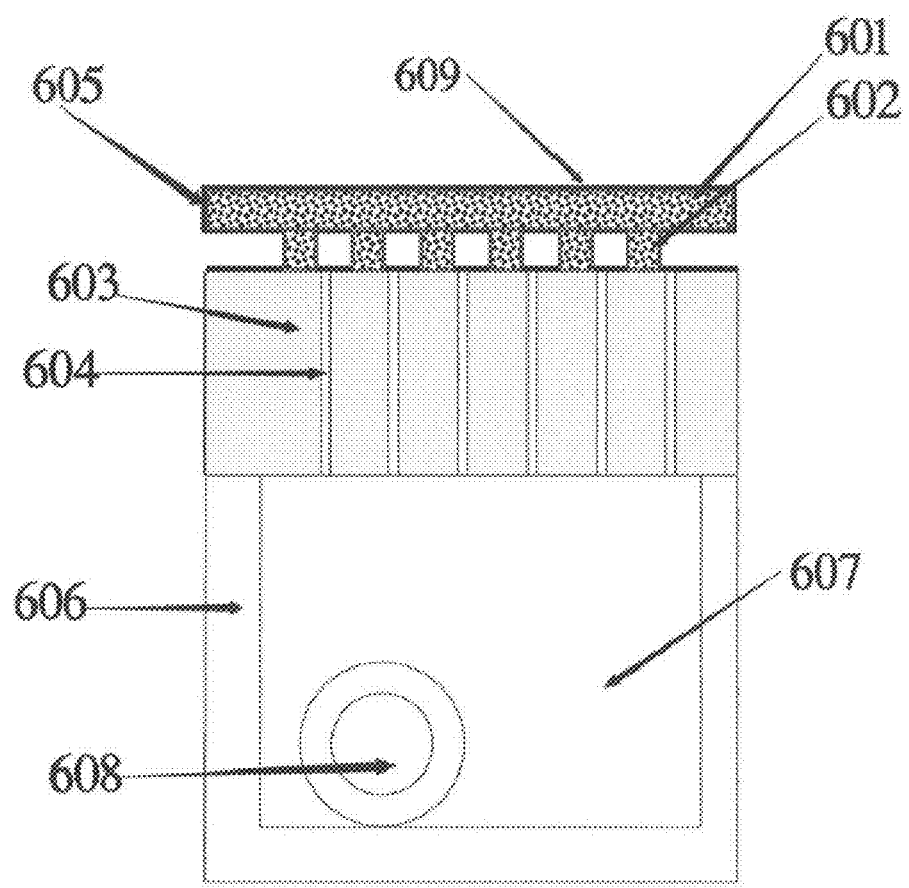
FIG. 6 illustrates a side view example of a 3D capillary array with matrix and monomer.

Referring to FIG. 6, a side view 3D capillary array with matrix and monomer reservoir is shown. Element 601 references a 90 degree metal trace of an array. Element 602 references a 90 degree metal trace array that is disposed below and perpendicular to trace 601 of the first trace array as shown. Element 603 references a fused tube support material; and element 604 references a hollow tube as disclosed herein. Element 605 references an oxidized surface layer. Element 606 references a monomer reservoir wall, element 607 references a monomer reservoir, element 608 references a monomer reservoir inlet, and element 609 references a non-stick release layer.

Figure 7:
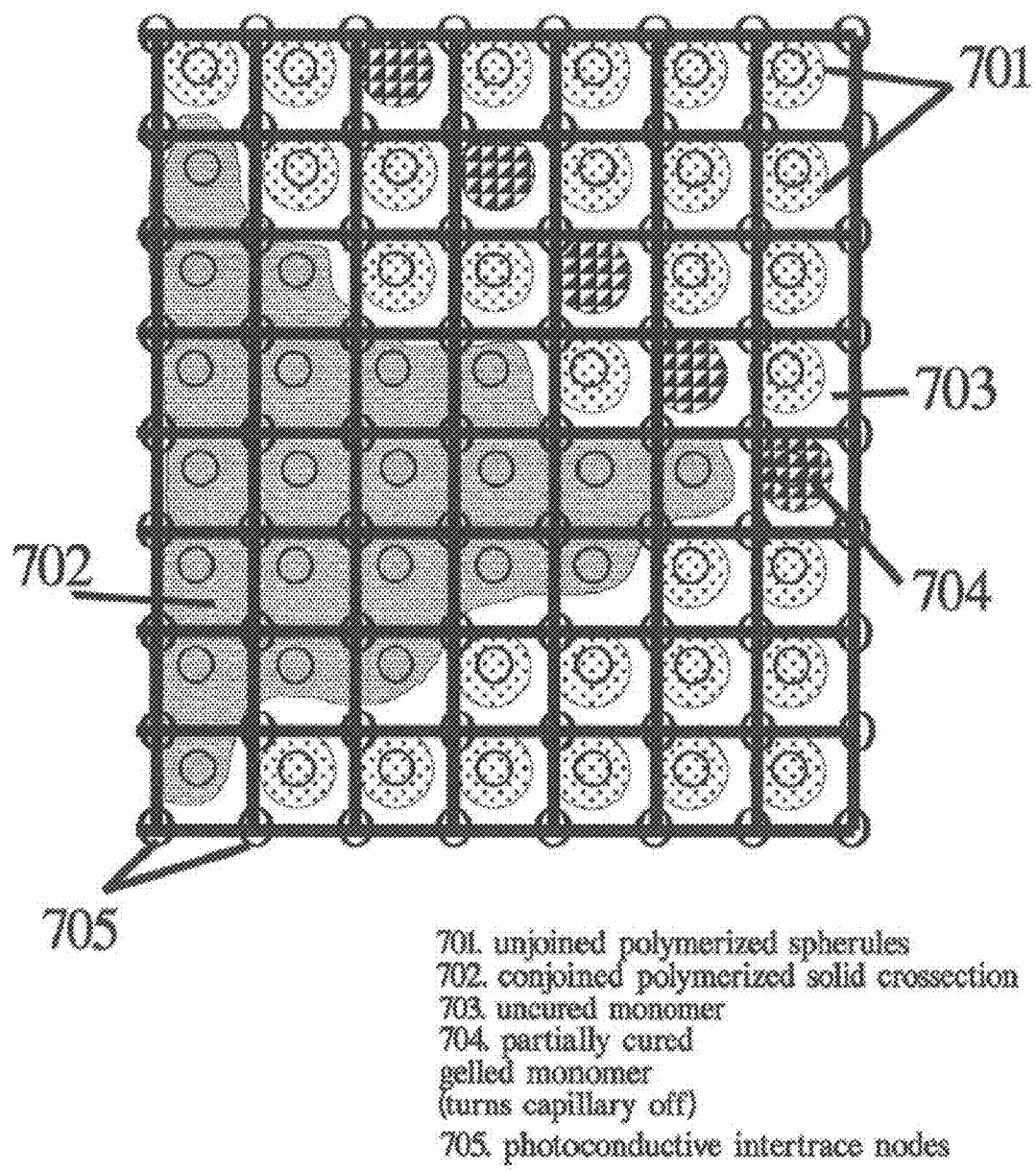
FIG. 7, illustrates a top view example of photo conductive nodes and partial cure voxels.

FIG. 7 illustrates a top view of photoconductive nodes and partial cured voxels. Element 701 references un-joined polymerized spherules, element 702 references conjoined polymerized solid cross section, element 703 illustrates uncured monomer, element 704 illustrates partially cured gelled monomer (e.g. turns capillary off), and element 705 references photoconductive inter-trace nodes.

As shown, in the light sensitive embodiments, Cadmium Selenide Nodes or other such material can be at each intersection of the traces via electro-deposition or CVD or other means. These are photoconductive. This is a remote method of addressing the X and Y traces in the matrix that are already biased with the same voltage and awaiting stimuli.

Therefore, when the Cadmium Selenide nodes are stimulated locally by light that transforms the Cadmium Selenide or any other photoconducting material into an electrical conductor. This is an alternate optical light-activated method for gating the electrical current and activating intersections instead of an electrical signal from addressing with digital drivers. The current flowing between the orthogonal X and Y traces is creating heat via a resistive layer. In this fashion heat is created to cure the monomer. The fiber optic build platen permits light to pass through it and activates the nodes. The build platen made of fiber optic capillaries that are bonded together and sliced in cross-section, which is serving as an extrusion platen, is actually an extremely fine optical element in its own right, as is known in the optical glass art, howveri is use in this method is novel and is claimed.

Utilizing the nodes therewith creates a light stimulated embodiment, which can then be addressed via sequential projected images.

These projected images can come from devices such as a cell phone with an application (app) for this purpose, a pad, tablet, or iPad also outfitted with an app, or other software, resident or not, for this purpose.

What will also be claimed and included within the disclosed machines and processes are RAM and/or ROM including computer executable instructions for causing a processing device, e.g. a computing device, to carry out the methods and processes disclosed herein. Such instructions can control a machine for creating an object or model the object and work with the machine to make the object. The machine can be controlled to vary the object mid-manufacture, and the object created can be manufactured in varied controlled methods that include variations in time as to layered-object creation and the use of different monomers or other curable materials. Color can be controlled, and changes in density, resiliency, and other mechanical properties of the material can be controlled based on chemistry, control, or electro-mechanical control, and/or fluidic control and temperature at any stage as disclosed elsewhere herein.

With only the topmost layer being selectively addressed, monomer reactions for thermosetting materials may also progress, as shown in FIG. 7. A proximity trace embedded film with low melting point carrier medium, as shown in FIG. 7, can selectively produce colored dyes, catalyst or synergist materials to be conducted through the platen via the capillary or other porous array into the build section surface. A partially cured voxel serves as an off valve for monomer transport via capillaries, as in FIG. 7.

Thus, the movable Z-stage platen can be above the voxel platen that the object can attach to. Because in one preferred embodiment the extrusion platen is stationary on top of the monomer manifold and as the object(s) are built the Z-stage moves up in accordance with the thickness of the layer just built, and the object being built attaches to it to release any pressure and create an accurate non-distorted object build. If the weight of the object is pressing down on the monomer as it comes up, this could flatten the layer of voxels unless the Z stage holds the object. The platen can also include not only the area that is doing the building, but also the platen that holds the object to move it away from the building extrusion area as it is "grown." There are also buoyancy mechanisms that can be employed by emmisible secondary liquids, which also serve the purpose of cooling any exotherm.

Figure 8:
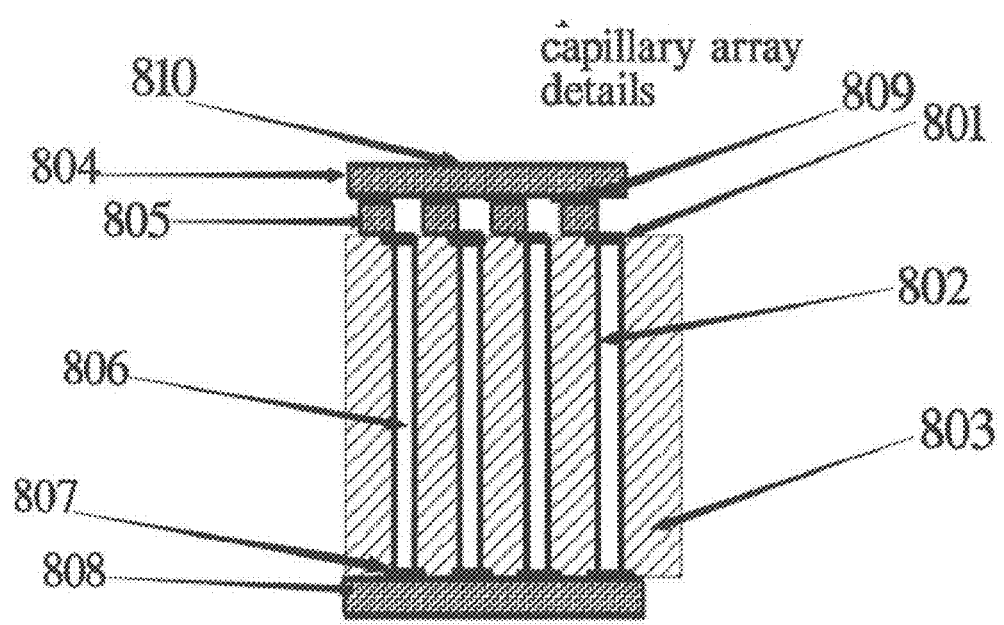
FIG. 8, illustrates a side view photoconductive spacer/node capillary array and further related details.

FIG. 8 illustrates a second circuit array that provides a circuit route for electrical current to pass through the first surface circuit array to emerge via an island conducting channel which is a metalized capillary thereby offering a conductive path between the two sides of the platen illustrated in FIG. 8. A double sided trace array allows the platen to be used in alternate build modes, selectively allowing thermoplastic materials passage via a Tg channel as shown in FIG. 8.

FIG. 8 illustrates a side view of FIG. 7. FIG. 8 illustrates a side view of a photoconductive spacer/node capillary array and related details. Element 801 refers to a conductive contact ring. Element 802 refers to a conductive film layer. Element 803 refers to a fused capillary material. Element 804 refers to a 90 degree conductive trace. Element 805 refers to a 90 degree conductive trace perpendicular to element 804. Element 806 refers to a hollow capillary. Element 807 refers to a conductive contact ring. Element 808 refers to a 90 degree conductive trace. Element 809 refers to a photoconductive spacer/node. And, element 810 refers to a non-stick release layer.

Figure 9:
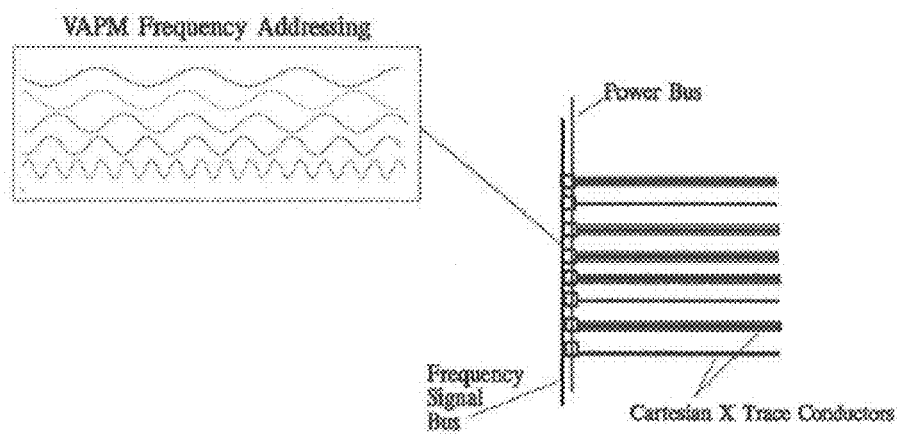
FIG. 9 illustrates a VAPM conceptual drawing.

FIG. 9 illustrates a VAPM conceptual drawing. Tunable timing for curing with the VAPM matrix is illustrated. This diagram represents an example of the addressing frequencies from the fastest passive matrix addressing possible, which uses MEMS in this embodiment. By using a SAW MEMs passive matrix array that is addressed by a multiplexed analog sweeper chopped by and slaved to the clock in a square wave video signal, addressing can occur at 4 MM times per second, far faster than previously known chemistries could cure without explosion. However, slowed or adjusted to the frame rate that matches the chemistry, this method of addressing is the perfect embodiment to adjust and tune to selected chemistry is being used. This can also be included in the embodiments that are used for visual addressing.

Figure 10:
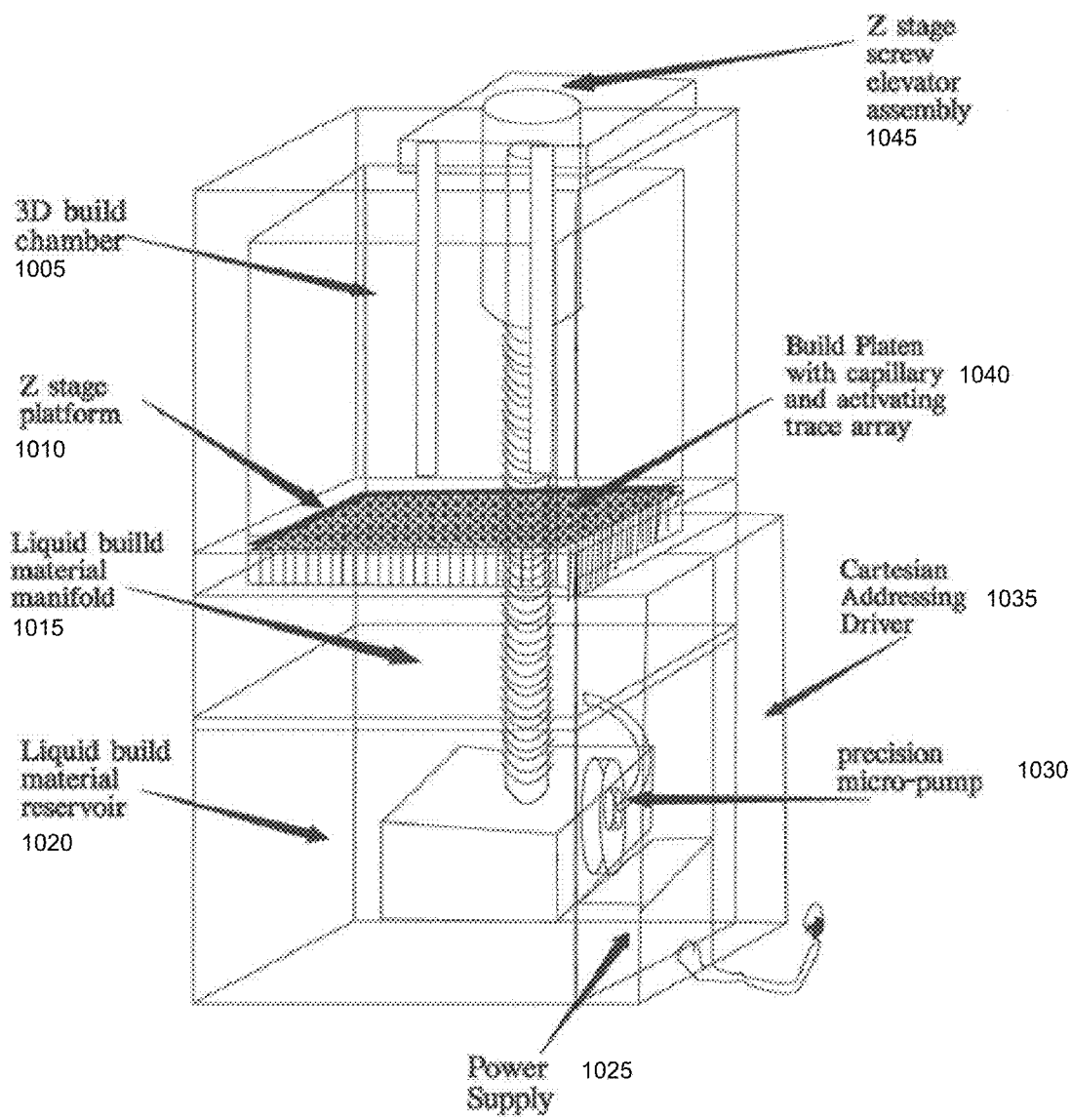
FIG. 10 illustrates the present invention core assembly as well as other details.

FIG. 10 illustrates a Voxel machine core assembly. Element 1005 refers to a 3D build chamber, element 1010 refers to a Z-stage platform. Element 1015 refers to a liquid build material manifold, element 1020 refers to a liquid build material reservoir, element 1025 refers to a power supply, element 1030 refers to a precision micro-pump, element 1035 refers to a Cartesian addressing driver, element 1040 illustrates the build platen with capillary and activating trace array, and element 1045 illustrates a Z-stage screw assembly embodiment, however hydraulics or other methods may be used.

Figure 11:
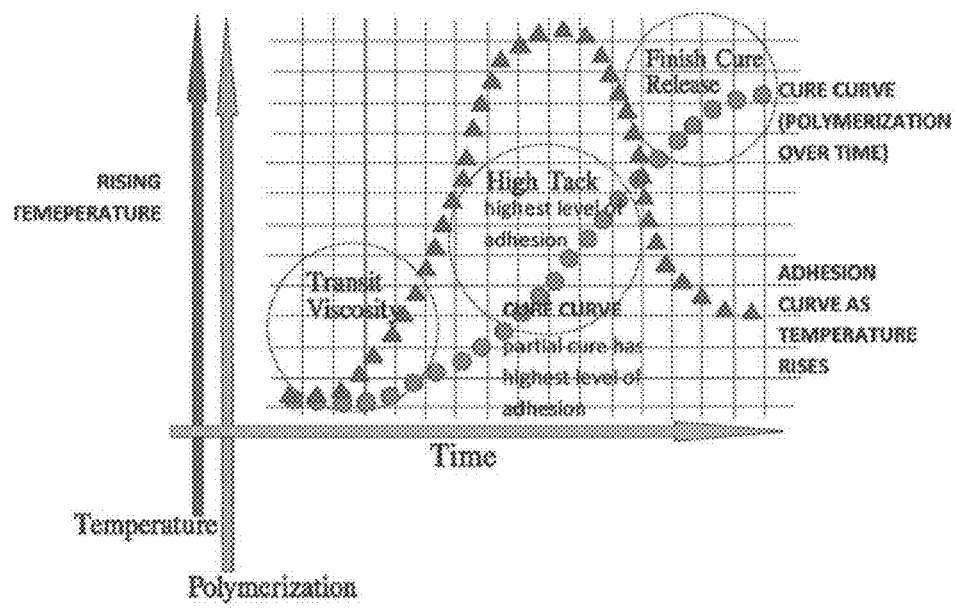
FIG. 11 illustrates a graph of voxel polymerization history of properties thereof over time and temperature.

FIG. 11 illustrates a voxel polymerization history. As shown, as temperature rises polymerization occurs and material goes from liquid to gel to solid. If left as gel by incomplete curing this closes or "valves" the capillary and will not permit more monomer to pass until it has finished curing by another signal addressed as desired. Thus, any of the attributes characterized in FIG. 11 can be controlled or selected based on parameters or sensed attributes and used real-time in feedback to control current and/or future control parameters. Software and coordinated machine behaviors will be controlling the monomer states and build area properties.

The proposed subject matter disclosed herein related to a novel high-speed, high-detail 3-D printing/additive-manufacturing device and associated chemistries, can utilize the following effects and states, which control the cure of the monomer and thus the building of objects. The monomer states as defined are:

1. Build State: Voxel that starts to catalyze and joins with the next droplet as it extrudes from the capillary, an elliptical shape (not a "pancake");

2. Valve state: Voxel is elliptical (not a "pancake"), but gelled (not fully catalyzed), and thus plugs or "valves" the capillary hole until it is de-valved;

3. De-valve build state: The gelled voxel is reheated to re-start the catalytic event to complete cure, to a ready-to-connect voxel with the continuous upsurge of fluid;

4. Sand bed state: Voxel is not allowed to connect with the other fluid, it cures fast and releases to create a support structure en masse as a sand bed. Sizing issues of granules will influence addressing and repetition of granule creation to ensure volumetric accuracy, as the shape of these may be rounder and require a different percentage of cured monomer to fill the volume with air between. That volumetric aspect relates to fluidic analysis, heat requirements, what shapes will by various monomer selections.

5. De-valve sand state: The gelled voxel is reheated to re-start the catalytic event to complete cure, to a disconnected sand granule voxel with the continuous upsurge of fluid.

It should be understood that these processes are determined by the characteristics of the monomer and latent heat catalyst, and their flow/temperature dependence. Accordingly, the software and hardware construction regulate flow and temperature as determined for various geometries, voxel shapes and sizes, and are related to specified gel/cure temperatures and monomer properties.

The machine has an integrally constructed platen, either of a randomly porous flat structure such as an open celled fused microsphere or particulate material, preferably of but not limited to, a variety of heat resistant materials such as silicate, ceramic, PTFE, polycarbonate or of metal having a passivated insulated oxide outer layer or preferably precisely cut flat platen consisting of parallel aligned fused micro capillaries. This platen permits the transit of liquid reactive monomers, thermoplastic or dissolved metal materials through an otherwise walled barrier between a supply reservoir and an image building section oppositely situated for the purpose of very rapid selective sequential planar voxel layer build construction of a 3D part or image.

This same machine with said platen can include at least one surface to be covered by a Cartesian orthogonal, polar coordinate, parallel or otherwise linear cross section of electrically conductive traces which can be selectively addressed at said trace cross sections with biased voltages, which cause activating heat and/or light to selectively activate monomer (polymerization, thermoplastic extrusion or inorganic metal or mineral precipitation primarily but not limited to electrolysis), for the purpose of very rapid selective sequential planar voxel layer build construction of a 3D part or image.

The conductive traces may be bonded by a plurality of optional methods. Such methods may include one or more of interlayer heat fusion, organopolysiloxane functionalized adhesion, indium or any variety of alloys specialized for the purpose affixing conducting metal to an open celled fused microsphere or particulate material. According to some embodiments, this may include a variety of heat resistant materials such as silicate, ceramic, PTFE, polycarbonate or of metal having a passivated insulated oxide outer layer or preferably precisely cut flat platen consisting of parallel aligned fused micro capillaries. The micro capillaries can be provided for the transit of liquid reactive monomers, thermoplastic or dissolved metal materials through an otherwise walled barrier between a supply reservoir and an image building section oppositely situated for the purpose of very rapid selective sequential planar voxel layer build construction of a 3D part or image.

A planar build platen can be sealed around its outer edges to hermetically seal and separate the reservoir section from the opposite build section surfaces. The Cartesian, orthogonal, polar coordinate, parallel or otherwise linear cross section of electrically conductive traces which can be selectively addressed by video drivers known in the art of the display industry, including, but not limited to, systematic orderly multiplexed passive, active, optical, or VAPM electrical signals (e.g. see U.S. Patent Publication 2009/0051863 A1 to the same inventor) at said trace cross sections. This can accomplish the purpose of very rapid selective sequential planar voxel layer build construction of a 3D part or image.

Auxiliary supporting machinery, which includes a precision movable Z-stage or vertically incrementally controlled planar section which moves away from the build platen can be included during the build process. This Z-stage can pull away from and allow for increased build volumes to transit through the platen without weight impeding built object growth or tp prevent distortion. Again, the build volumes can include liquid reactive monomers, thermoplastic or dissolved metal materials.

A variety of build modes are addressable to the build platen, which provides a means of interfused layered voxel integument, such as dendritic or sprue supports or a plurality of multiple non interfused yet polymerized particulates (sand bed) dispersed also as basic support members for an otherwise necessary build article needing physical supports. Such build articles can include extended structures, which may be horizontal or island in nature.

A build mode can also include a partially activated, but incomplete, polymerization area (valve state) that serves the purpose of blocking transit of further material beneath it. This can essentially act as an off-valve until it becomes necessary to finish activating the polymerization, thus releasing from the build platen's capillary surface.

The machine architecture may also include the acoustically live element but not limited to, ultrasonic piezo-, magneto-restrictive, or speaker mechanism, also for the purpose of aiding in the release of successive layers from the platen and also to enhance movement of the fluid through the capillaries or platen, via reduction of surface tension thereby, which also reduces required pressurization of monomer in the monomer manifold. This machine will include variously necessary removable enclosures for the successful build and removal of said build object upon completion, and replenishment of monomers and cleaning of platens.

Various machines disclosed herein may include but not be limited to, a series of fitted cassette and/or replaceable volume build material cartridges for the purpose of augmented ease of operation and safety precautions. Said machine may include but is not limited to either an attached or an unattached sealable reservoir for finish cycle polymerization or neutralization of otherwise reactive unusable build materials for the purpose of rendering them as toxicologically benign.

Such machine disposal reservoir may also utilize a variety of newly discovered photo redox catalysis, such as but not limited to, nano-scale particulate anatase titanium dioxide and several metallic doped varieties of the same. These can be used to consume organic materials by reducing them in the presence of light energy, to inert gaseous byproducts such as nitrogen, carbon dioxide and water for the purpose of rendering them as toxicologically benign.

Various machines may be integrated with any variety of computer hardware or computer programs designed specifically for the purpose of image building with real materials. Such machines, may be augmented by, but not limited to, an additional optical support and focusing mechanism capable of projecting either a physically attached or unattached visual imagery system from behind the build surface, thereby leveraging the natural features of light guides, which are also said capillary liquid delivery structures for the purpose of activating a photo conductive resistive element. This photo conductive resistive element may be deposited (or otherwise located) between the intersecting conductive addressing nodes which cause activating heat and/or light to selectively activate monomer polymerization. This can also augment the necessary energy required for such polymerization voxelization build events.

Various machines disclosed herein may incorporate several additional platens, which are vertically or horizontally separate, but integrated physically into the same machine.

Biologic materials such as collagen and/or suspended cellular materials may also be activated by the build platen including the purpose of prosthetic use, active biocultures or non-invasive modeling studies. Such machines may also prove useful as an electrophoresis separation platform due to the incorporated addressable voltage separation feature/option.

Methods, computer systems, computer-storage media, and graphical user interfaces are provided for controlling a rapid three dimensional modeling apparatus and method. Also methods, computer systems, computer-storage media, and graphical user interfaces are provided for manufacturing the machines, platens, and other components. Other computing devices are used for controlling chemistry and materials for deposition and curing as well as sensors and/or feedback control of the creation of the rapidly-made objects.

Embodiments of the present invention relate to systems, methods, computer storage media, and interactive graphical user interfaces (GUIs) for, among other things, displaying and interacting with performance data for a machine-learned model.

Accordingly, in one embodiment, the present invention is directed to one or more computer-readable media having computer-executable instructions embodied thereon that, when executed by a computing device, cause the computing device to generate a graphical user interface (GUI) for visualizing the design and manufacture of an object made using the rapid three dimensional modeling apparatus and methods. The GUI comprises an item representation display area that displays a plurality of item representations corresponding to a plurality of items processed by the machine-learned model.

In another embodiment, the present invention is directed to one or more computer-readable media having computer-executable instructions embodied thereon that, when executed by a computing device (e.g. a server computer, carriage computer, needle-point printer computer, artist computer, article design and/or assembly computer, etc.), cause the computing device to perform methods, visualizations and manipulations of digital models and manufacturing and object manufacturing control procedures as disclosed herein.

An example of an operating environment in which embodiments of the present invention may be implemented is described below in order to provide a general context for various aspects of the present invention. An exemplary operating environment for implementing embodiments of the present invention is a computing device. The computing device is but one example of a suitable computing environment and is not intended to suggest any limitation as to the scope of use or functionality of embodiments of the invention. Neither should the computing device be interpreted as having any dependency or requirement relating to any one or combination of components illustrated.

Embodiments of the invention may be described in the general context of computer code or machine-usable instructions, including computer-usable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

The computing device can include a bus that directly or indirectly couples the following devices: a memory, one or more processors, one or more presentation components, one or more input/output (I/O) ports, one or more I/O components, and a power supply. The bus represents what may be one or more busses (such as an address bus, data bus, or combination thereof). One may consider a presentation component, such as a display device, to be an I/O component. Also, processors have memory. Distinction is not made between such categories as "workstation," "server," "laptop," "hand-held device," etc., as all are contemplated within the scope of a "computing device."

An example of a computing device typically includes a variety of computer-readable media. Computer-readable media may be any available media that is accessible by the computing device and includes both volatile and nonvolatile media, and removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory includes computer-storage media in the form of any combination of volatile and nonvolatile memory. The memory may be removable, non-removable, or a combination thereof. Exemplary hardware devices include solid-state memory, hard drives, optical-disc drives, and the like. The computing device includes one or more processors that read data from various entities such as the memory or the I/O components. The presentation component(s) present data indications to a user or other device. Exemplary presentation components include a display device, speaker, printing component, vibrating component, and the like.

The I/O ports allow the computing device to be logically coupled to other devices including the I/O components, some of which may be built in. Illustrative components include a microphone, joystick, game pad, satellite dish, scanner, printer, wireless device, and the like. Interaction with the I/O components may be via voice, touch, gestures, keyboard, a pointing device such as a mouse, and the like.

Furthermore, although the term "server" is often used herein, it will be recognized that this term may also encompass a search service, a search extender service, a Web browser, a cloud server, a set of one or more processes distributed on one or more computers, one or more stand-alone storage devices, a set of one or more other computing or storage devices, a combination of one or more of the above, and the like.

A data store stored on a computer readable medium of a computing device is described. The data store includes control parameters disclosed herein. For example, the computer executable instructions stored on the memory can include control instructions for controlling the platen, matrix, curable material characteristics, flow characteristics, platen positioning, releasing oscillation, platen manufacture, color control, heat control, curing light, image resolution, bitmap, vector, etc. including any aspect of the machine and process control disclosed herein in use or manufacture or any part thereof. Modeling software and machines are also disclosed herein that may including modeling of the virtual object prior to manufacture, post process control, control of material refill, control of part validation and quality control. Thus, when stored as a data structure on a computer readable medium, RAM, and/or ROM the medium structure may be moved, accessed, instruction followed, written, rewritten, copied in its tangible form as a non-transitory replication of magnetic, optical, and other media, etc.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The subject of several embodiments of the invention disclosed herein can offer a novel, extremely rapid, and high-resolution alternative machine design and material selection for three-dimensional printing. Various embodiments of the inventions relate to machines for manufacturing an object. Various embodiments of the inventions relate to extrusion platens, or other platen components and combination of components. Various embodiments of the inventions relate to processes and methods for making, using, and partially manufacturing, as wells as controlling machines and making objects. Several embodiments of the invention relate to computer stores. Several embodiments of the invention relate to software, hardware, and other products and machines as well as the manufactured objects made by the machines and processes disclosed herein. Several embodiments relate to processes for manufacturing, making, and using the machines and/or objects in combination with other features and/or acts and steps.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. An additive manufacturing machine, comprising:
a platen including a two dimensional array of extrusion ports extending in an X direction and a Y direction, the X direction being perpendicular to the Y direction, the two dimensional array of extrusion ports including means for simultaneously extruding individual curable voxels of sequential layers of an object; and
a photo-reactive matrix disposed adjacent to the two dimensional array of extrusion ports, the photo-reactive matrix including means for sequentially curing the simultaneously extruded individual curable voxels of each layer according to a sequence of images projected to the matrix.

2. An additive manufacturing machine according to claim 1, further comprising a Z stage configured to sequentially move the platen in only a vertically direction perpendicular to the X and Y directions of the two dimensional arrays of extrusion ports.

3. An additive manufacturing machine according to claim 1, further comprising a Z stage configured to sequentially move an object support away from the platen without moving the support relative to the platen in the X or Y direction while building the object.

4. An additive manufacturing machine according to claim 1, the means for sequentially curing comprising an optical projector arranged for projecting the sequence of optical images to the photo-reactive matrix, each optical image being associated with the sequential layers of the object.

5. An additive manufacturing machine according to claim 1, the photo-reactive matrix the means for sequentially curing including a photoconductive material.

6. An additive manufacturing machine according to claim 5, wherein the photoconductive material includes Cadmium Selenide.

7. An additive manufacturing machine according to claim 5, wherein the photoconductive material is disposed between conductive traces of the photo-reactive matrix addressing the two dimensional array of extrusion ports.

8. An additive manufacturing machine according to claim 5, wherein projecting an image onto the optically addressable photo-reactive matrix causes activation of the photoconductive material thereby causing the individual voxels of the first layer of the object to cure.

9. An additive manufacturing machine according to claim 1, wherein projecting an image onto the optically addressable photo-reactive matrix causes heat at locations of the image projected.

10. An additive manufacturing machine according to claim 9, wherein the heat causes the individual voxels of the first layer of the object to cure simultaneously.

11. An additive manufacturing machine according to claim 1, the two dimensional array of extrusion ports being formed of an optically transmissive material.

12. An additive manufacturing machine according to claim 1, the two dimensional array of extrusion ports includes a two dimensional array of optically transmissive glass tubes.

13. An additive manufacturing machine according to claim 1, further comprising a movable stage for moving the two dimensional array of extrusion ports relative to a support substrate to which the individual voxels of the first layer of the object are extruded.

14. An additive manufacturing machine according to claim 13, wherein the movable stage moves the two dimensional array of extrusion ports in a Z direction perpendicular to the X and Y directions.

15. An additive manufacturing machine according to claim 13, wherein the two dimensional array of extrusion ports are only moved in a direction perpendicular a surface of the support substrate to which multiple successive layers of the object are extruded.

16. An additive manufacturing machine according to claim 1, wherein multiple successive layers of the object are associated with multiple sequentially projected images.

17. A method of manufacturing an object using an additive manufacturing machine according to claim 1, comprising:
simultaneously extruding individual voxels of an entire first layer of an object from the two dimensional array of extrusion ports to a support structure;
subsequent to the extruding the first layer of the object step, distancing the support structure only vertically away from the two dimensional array of extrusion ports; and subsequent to the distancing the support structure from the two dimensional array of extrusion ports, simultaneously extruding individual voxels of an entire second layer of an object from the two dimensional array of extrusion ports upon the first layer of the object.

18. A method of manufacturing an object according to claim 17, wherein the individual voxels of the entire first layer of the object are selectively extruded and cured by projection of an image upon the optically addressable photo-reactive matrix including a photoconductive material.

19. A method of manufacturing an object according to claim 17, wherein individual voxels of the first layer of the object and the second layer of the object are selectively extruded and cured by projection of sequential images upon the optically addressable photo-reactive matrix including a photoconductive material.

20. A three dimensional printer comprising:
the additive manufacturing machine according to claim 1; and
a projector configured to project a sequence of optical images on the photo-reactive matrix including photo-reactive nodes, each optical image causing the simultaneous cure of individual layers of the object as sequential layers of the object are extruded from the two dimensional array of extrusion ports.

* * * * *